US011763305B1

(12) United States Patent
Prasad et al.

(10) Patent No.: US 11,763,305 B1
(45) Date of Patent: *Sep. 19, 2023

(54) DISTRIBUTED LEDGER FOR DEVICE MANAGEMENT

(71) Applicant: United Services Automobile Association (USAA), San Antonio, TX (US)

(72) Inventors: Bharat Prasad, San Antonio, TX (US); Ruthie D. Lyle, Durham, NC (US); Minya Liang, Redmond, WA (US); Thomas Bret Buckingham, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/853,412

(22) Filed: Jun. 29, 2022

Related U.S. Application Data

(63) Continuation of application No. 15/905,395, filed on Feb. 26, 2018, now Pat. No. 11,392,947.

(Continued)

(51) Int. Cl.
*G06Q 20/40* (2012.01)
*G06F 16/27* (2019.01)
(Continued)

(52) U.S. Cl.
CPC ......... *G06Q 20/4014* (2013.01); *G06F 16/27* (2019.01); *G06Q 20/06* (2013.01); *G06Q 20/325* (2013.01)

(58) Field of Classification Search
None
See application file for complete search history.

(56) References Cited

U.S. PATENT DOCUMENTS 9,992,022 B1 *  6/2018  Chapman ............... G06F 21/604
10,425,414 B1 *  9/2019  Buckingham .......... G06F 21/35
(Continued)

FOREIGN PATENT DOCUMENTS

AU        2016101183 A4    9/2016
CN         105681301 A     6/2016
(Continued)

OTHER PUBLICATIONS

Chao machine translation (Year: 2017).*

*Primary Examiner* — Paul S Schwarzenberg
(74) *Attorney, Agent, or Firm* — Fletcher Yoder P.C.

(57) ABSTRACT

Techniques are described for managing devices, such as Internet of Things (IoT) devices, using smart contract(s) on a distributed ledger (e.g., blockchain). Smart contract(s) executing on a distributed ledger may control access to one or more devices in a home or other environment. The smart contract(s) may employ information stored on the distributed ledger and information in a transaction sent to the smart contract(s) to determine whether particular user(s) and/or process(es) may access the device(s), issue commands to the device(s), access data generated by the device(s), and/or control the device(s). The smart contract(s) may provide a secure portal through which user(s) and/or service(s) may access device(s) for command and control of such device(s), and secure access may be based on permission information that is specified or provided by an owner or operator of the device(s) and that is stored on the distributed ledger.

20 Claims, 13 Drawing Sheets

Related U.S. Application Data

(60) Provisional application No. 62/463,824, filed on Feb. 27, 2017.

(51) Int. Cl.
  *G06Q 20/32* (2012.01)
  *G06Q 20/06* (2012.01)

(56) References Cited

U.S. PATENT DOCUMENTS

| | | |
|---|---|---|
| 2015/0332395 A1 | 11/2015 | Walker et al. |
| 2015/0371224 A1 | 12/2015 | Lingappa |
| 2015/0379510 A1 | 12/2015 | Smith |
| 2016/0203477 A1 | 7/2016 | Yang et al. |
| 2016/0210626 A1 | 7/2016 | Ortiz et al. |
| 2016/0371771 A1 | 12/2016 | Serrano et al. |
| 2017/0046664 A1 | 2/2017 | Haldenby et al. |
| 2017/0046792 A1* | 2/2017 | Haldenby ............ H04L 9/3247 |
| 2017/0046799 A1 | 2/2017 | Chan et al. |
| 2017/0053249 A1 | 2/2017 | Tunnell et al. |
| 2017/0053467 A1* | 2/2017 | Meganck ........... G07C 9/00563 |
| 2017/0076306 A1 | 3/2017 | Snider et al. |
| 2017/0103391 A1 | 4/2017 | Wilson, Jr. et al. |
| 2017/0109748 A1 | 4/2017 | Kote |
| 2017/0134161 A1 | 5/2017 | Goeringer et al. |
| 2017/0140375 A1 | 5/2017 | Kunstel |
| 2017/0221029 A1 | 8/2017 | Lund et al. |
| 2017/0228371 A1 | 8/2017 | Seger, II |
| 2017/0228704 A1 | 8/2017 | Zhou et al. |
| 2017/0228734 A1 | 8/2017 | Kurian |
| 2017/0230375 A1 | 8/2017 | Kurian |
| 2017/0236123 A1 | 8/2017 | Ali et al. |
| 2017/0237554 A1 | 8/2017 | Jacobs et al. |
| 2017/0243208 A1 | 8/2017 | Kurian et al. |
| 2017/0270527 A1 | 9/2017 | Rampton |
| 2017/0279783 A1 | 9/2017 | Milazzo et al. |
| 2017/0286717 A1 | 10/2017 | Khi et al. |
| 2017/0287068 A1 | 10/2017 | Nugent |
| 2017/0358041 A1* | 12/2017 | Forbes, Jr. ............. G06Q 10/00 |
| 2018/0020324 A1* | 1/2018 | Beauford ................ H04L 43/10 |
| 2018/0117446 A1* | 5/2018 | Tran ...................... A42B 3/0433 |
| 2018/0184298 A1* | 6/2018 | Chen ..................... H04W 48/20 |
| 2018/0254905 A1* | 9/2018 | Chun .................... H04L 9/3236 |
| 2018/0308087 A1* | 10/2018 | Maimon ............ G06Q 20/3552 |
| 2019/0026716 A1* | 1/2019 | Anbukkarasu ....... G06Q 20/389 |
| 2019/0163896 A1* | 5/2019 | Balaraman ............. G06F 16/27 |

FOREIGN PATENT DOCUMENTS

| | | | | |
|---|---|---|---|---|
| CN | 106097101 A | | 11/2016 | |
| CN | 106228446 A | | 12/2016 | |
| CN | 106339875 A | | 1/2017 | |
| CN | 106355488 A | | 1/2017 | |
| CN | 106408299 A | | 2/2017 | |
| CN | 106452785 A | | 2/2017 | |
| CN | 106453415 A | | 2/2017 | |
| CN | 106485167 A | | 3/2017 | |
| CN | 106530083 A | | 3/2017 | |
| CN | 106790431 A | | 5/2017 | |
| CN | 106875518 A | * | 6/2017 | ............ G06F 21/35 |
| CN | 106875518 A | | 6/2017 | |
| KR | 101590076 B1 | | 2/2016 | |
| WO | 2015085393 A1 | | 6/2015 | |
| WO | 2016154001 A1 | | 9/2016 | |
| WO | 2017027648 A1 | | 2/2017 | |
| WO | 2017065389 A1 | | 4/2017 | |
| WO | 2017066715 A1 | | 4/2017 | |
| WO | 2017091530 A1 | | 6/2017 | |
| WO | 2017095036 A1 | | 6/2017 | |
| WO | 2017136956 A1 | | 8/2017 | |
| WO | 2017139688 A1 | | 8/2017 | |

* cited by examiner

DISTRIBUTED LEDGER FOR DEVICE MANAGEMENT

CROSS-REFERENCES TO RELATED APPLICATIONS

This application is a continuation of U.S. patent application Ser. No. 15/905,395, filed on Feb. 26, 2018, which claims priority to U.S. Provisional Patent Application No. 62/463,824, filed on Feb. 27, 2017, both of which are incorporated herein by reference in their entireties for all purposes.

BACKGROUND

There has been a dramatic increase in the number of appliances, devices, utility devices, mechanisms, lighting fixtures, security devices, and/or other types of devices that are available for the home or other environments, and that include data collection, computing, sensing, and/or network communication capabilities in addition to their normal functionality. These devices may be described as smart appliances, smart vehicles, smart building components, smart infrastructure components, and so forth, and may also be described as Internet of Things (IoT) devices. The various devices may generate data, such as sensor data, status information, and so forth, and the data may be shared among the devices over one or more wired or wireless networks using a variety of communication protocols to provide an IoT platform. In some instances, the devices may be sensed and controlled remotely over one or more networks, and the data generated by the devices may be collected, analyzed, or otherwise processed by computing devices, analytic cloud based IoT platforms and/or individuals.

DRAWINGS

DETAILED DESCRIPTION

Figure 1:
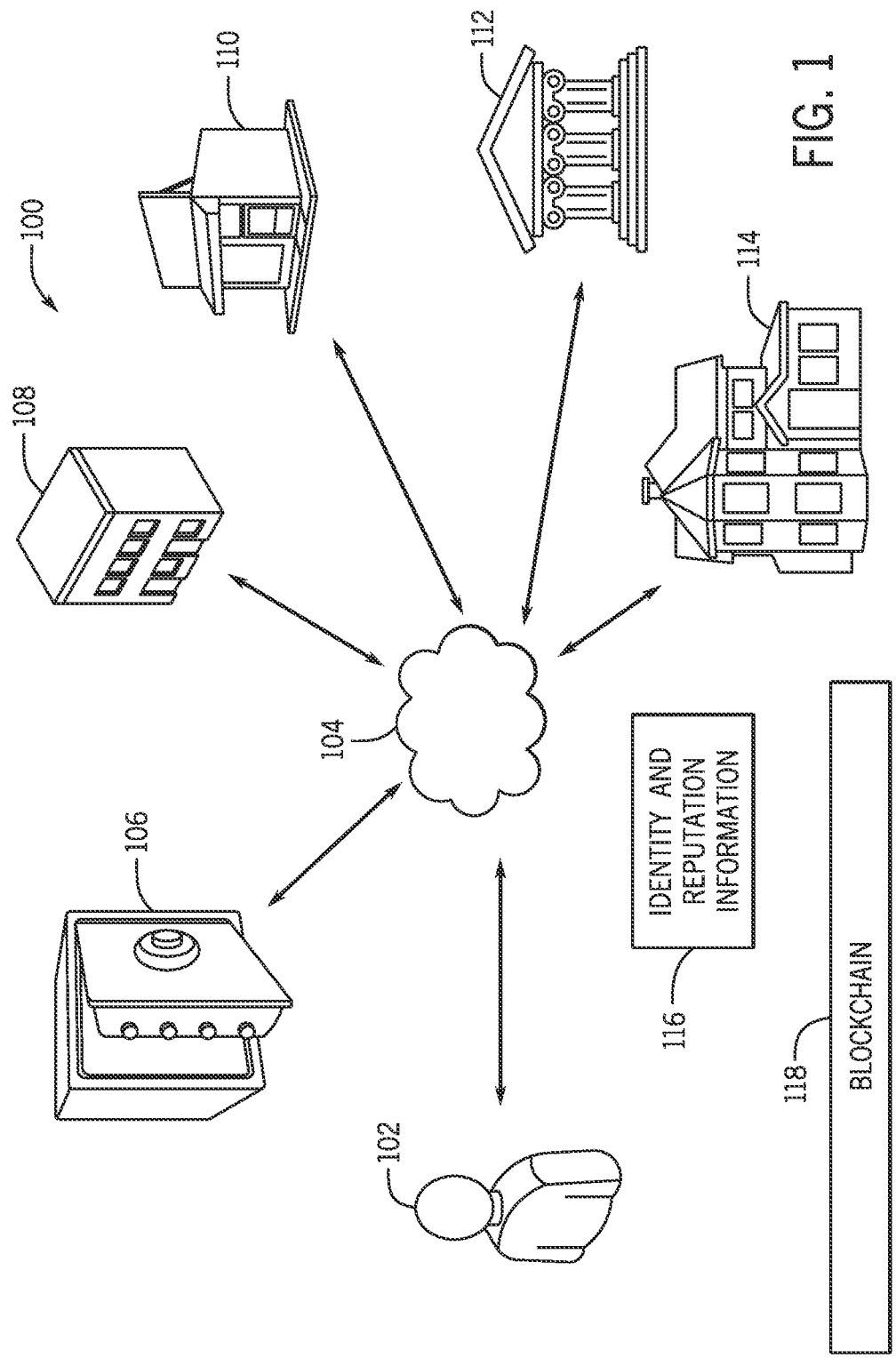
FIG. 1 illustrates and an example environment in which a decentralized identity management system may operate, in accordance with embodiments described herein.

Identity management generally involves identifying individuals in a system (such as a country, a network, or an enterprise) and controlling access to resources within that system by associating user rights and restrictions with the established identity. In addition, reputation management is the practice of attempting to shape public perception of a person or organization by influencing online information about that entity. In blockchain environments, such as Bit-Coin, anyone can claim ownership of an address by signing a message that includes the address. For example, a person can register an address with BitCoin and use that address for sending or receiving money. The address can also be used to sign messages. Thus, the "identity verification" currently performed in blockchain environments may only prove that an individual has access to an address, and may not actually verify the identity of the individual using the address. BitCoin and other blockchain environments currently do not have any trusted method of associating an identity with an address Embodiments of the present disclosure are generally directed to secure device management. More particularly, embodiments of the present disclosure are directed to managing a network of IoT devices using information and/or computer programming code on a distributed ledger system such as a blockchain. The computer programming code may include smart contracts, which may also be described as self-executing contracts, blockchain contracts, digital contracts, and/or chain code. As used herein, a smart contract refers to computer programming code executed by a distributed ledger system.

In general, certain embodiments of the present disclosure may be embodied in a method that includes the following actions: receiving, by a smart contract, a request for a user device to issue a command to an IoT device; accessing, by the smart contract, permission information stored on a distributed ledger, the permission information indicating at least one user authorized to interact with the IoT device; and determining, by the smart contract, that the user device is permitted to issue the command to the IoT device, based at least in part on the permission information indicating that an authenticated user of the user device is authorized to interact with the IoT device and, in response, sending the command from the user device to the IoT device through the smart contract.

In addition, certain embodiments of the present disclosure may be embodied in methods that include acts providing access to a decentralized identity management system to a user. In certain embodiments, the methods include the act of storing user identity information on the decentralized identity management system. The methods also include the act of enabling one or more other users to store reputation information associated with the user identity. The methods also include the act of using the reputation information in a transaction with the user.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Certain embodiments of the present disclosure provide at least the following technical advantages and/or improvements compared to previously available techniques. Through use of smart contract(s) executing on a distributed ledger, certain embodiments provide a secure method for controlling access to IoT device(s) for users such as device owners and other users who are granted such access by an owner of the IoT device(s). In certain embodiments, access is granted on, and verified against, user identity. In addition, access attempts to an IoT device through the smart contract(s) may be automatically logged by the immutable distributed ledger, providing an audit trail of usages and attacks. Moreover, management of a user's identity and credentials is pushed out to the peripheral of the network, removing the traditional centralized credential management system (e.g., a "pot of gold") that may be accessible to unauthorized individuals, such as fraudsters, criminals, and so forth, thus reducing the impact of a successful security breach. Accordingly, certain embodiments make IoT device(s) less vulnerable to fraudulent attacks, theft of sensitive data, commandeering by malicious individuals, and/or other security risks that are present in a traditional IoT device ecosystem. Moreover, in a traditional environment, IoT device(s) supplied by different vendors may communicate using different, possibly incompatible, communication protocols. By providing a smart contract as an intermediary that manages communications to and from IoT devices, certain embodiments enable command and control of IoT devices that natively support different and otherwise incompatible communication protocols. The decentralization and immutability aspects of a distributed ledger build trust across multiple entities (e.g., individuals and/or organizations) by enabling unchangeable tracking of normal interactions as well as malicious attacks. Moreover, the use of distributed peer-to-peer network technology such as a blockchain removes the infrastructure requirement for traditional server-based solutions. The peer-to-peer network can be accessed anywhere there is a network connection.

The present disclosure describes uses of a decentralized identity management system. Identity management is a broad technology area that deals with identifying individuals in a system (such as a country, a network, or an enterprise) and controlling access to resources within that system by associating user rights and restrictions with the established identity. In general, a decentralized identity management system maintains identity information for users. The identity information can be under individual control, can be secure, and can be portable. Individual user's can control their own identity information. Users can add information to their identity information, or ask other individuals or institutions to add information to it. The identity may include claims, disclosures, and proofs. For example, a user may create an identity and then request that a university issue a cryptographically signed claim that the user has a degree from that university. Similarly, the decentralized identity management system may store claims that the user works for an organization, is a member of the military, is disabled, is a veteran, etc. A user's identity information may be protected using public key or private key encryption techniques. In certain embodiments, some information about a user may be publicly available; while other information about the user may be private and may only be shared by the owner of the information. Publicly available information can be protected using encryption.

Some of the features that may be provided by the decentralized identity management system includes access to a blockchain or an identity management account from a mobile app, an embedded app, or a web app. In certain embodiments, the decentralized identity management system may securely store identity attributes on a blockchain. In certain embodiments, the decentralized identity management system may store identity attributes/reputation scores owned/issued by different authorities. In certain embodiments, the owner of an identity may selectively share attributes with another party. In certain embodiments, transactions may be limited to only a subset of accounts and/or a subset of identities.

Present embodiments are generally directed toward methods and systems that employ a blockchain infrastructure to perform decentralized identity management for the purpose of enabling control of IoT devices. In general, blockchains are continuously growing lists of records (e.g., blocks), which are linked and secured using cryptography, for example. By using a blockchain infrastructure that enables the functionality of smart contracts, the methods and systems described herein allow a persistent, replicated, public, and automated database which may decrease substantially the operational costs associated with enabling control of the IoT devices.

As described herein, smart contracts refer to distributed programs, or distributed applications that may be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved.

As such, the embodiments described herein include methods and systems for deployment, maintenance, and interaction with the distributed ledgers and smart contracts to facilitate decentralized identity management of users for the purpose of enabling user control of IoT devices based at least in part on identity information that is verified by the decentralized identity management system. The embodiments described herein may include blockchain techniques, as well as the terminals and servers that operate blockchain nodes, as described herein. Technical advantages of the embodiments described herein also include the use of public and/or private blockchains to perform automated, trusted operations for the purpose of enabling control of the IoT devices. The systems described herein allow the performed operations to be transparent, public, and tamper-proof and, thus, may reduce the overall cost of enabling control of IoT devices. Furthermore, the embodiments described herein enable users to control IoT devices that are associated with them in a much more user-friendly manner. More specifically, the decentralized identity management systems described herein perform much more of the user authentication functions due at least in part to the relative tamper-proof nature of blockchains, distributed ledgers, and the smart contracts that may be associated with them.

It will be appreciated that certain embodiments of the present disclosure may include any combination of the aspects and features described herein. That is, the embodiments described herein are not limited to the combinations of aspects, and features specifically described herein, but also include any combination of the aspects and features provided. The details of one or more embodiments of the present disclosure are set forth in the accompanying drawings and the description below. Other features and advantages of the present disclosure will be apparent from the description and drawings, and from the claims.

FIG. 1 illustrates an example environment 100 in which a decentralized identity management system 104 may operate, in accordance with embodiments described herein. A user 102 may have his identity managed by the decentralized identity management system 104. The decentralized identity management system 104 may provide identification services to a large number of different organizations. For example, the decentralized identity management system 104 may verify the identity of the user 102 to a cloud storage system 106, companies and institutions 108, merchants and retailers 110, financial institutions 112, and IoT devices 114 (generally, the IoT devices refer to the interconnection via the Internet of computing devices embedded in physical devices, enabling them to send and receive data. Examples of these devices, include, but are not limited to, Internet connected locks, refrigerators, thermostats, home security systems, etc.).

The decentralized identity management system 104 may authenticate the user 102 and then provide information about the user to various counterparties. In some scenarios, the identity information provided to the counterparty may be specifically tailored for that counterparty or for all counterparties of the same or similar type (for example, one set of information about the user 102 may be provided to all financial institutions, while a different set of information about the user 102 may be provided to retailers.) In other embodiments, the user 102 may create an identity by combining different attributes about the user 102.

In certain embodiments, the decentralized identity management system 104 may maintain identity and reputation information 116 on behalf of the user 102 (and other users, not shown). The identity and reputation information 116 may be stored, for example, in a distributed ledger of the decentralized identity management system 104, such as a blockchain 118. In certain embodiments, the blockchain 118 may be a public or private ledger of all transactions that have been executed in one or more contexts (e.g., negotiable instrument transactions, digital currency transactions, access determinations, instances of providing access, etc.). The blockchain 118 may grow as completed blocks are added with a new set of transactions by the decentralized identity management system 104. In certain embodiments, a single block is provided from multiple transactions (e.g., multiple deposits of different checks by different people). In general, blocks are added to the blockchain 118 in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain 118, which is automatically downloaded to the node upon joining the peer-to-peer network. The blockchain protocol provides a secure and reliable method of updating the blockchain 118, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a particular transaction. The blockchain 118 enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain 118). In certain embodiments, the blockchain 118 may also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to the blockchain 118 based on the blockchain protocol. In general, multiple miners validate transactions that are to be added to a block, and compete (e.g., perform work, as introduced above) to have their block added to the blockchain 118. Validation of transactions includes verifying digital signatures associated with respective transactions. For a block to be added to the blockchain 118, a miner must demonstrate a proof of work before their proposed block of transactions is accepted by the peer-to-peer network, and is added to the blockchain 118. In certain embodiments, the blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value, in that the hash value cannot be "un-hashed" to determine what the input was. In certain embodiments, the blockchain protocol may require multiple pieces of information as input to the CHF. For example, the input to the CHF may include a reference to the previous (most recent) block in the blockchain 118, details of the transaction(s) that are to be included in the to-be-created block, and a nonce value (e.g., a random number used only once).

Multiple nodes may compete to hash a set of transactions and provide the next block that is to be added to the blockchain 118. In certain embodiments, the blockchain protocol provides a threshold hash to qualify a block to be added to the blockchain 118. For example, the threshold hash may include a predefined number of zeros (0s) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain 118. Each miner provides the reference to the previous (most recent) block in the blockchain 118, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 118. Consequently, the respective miner's block is broadcast across the peer-to-peer network. All other miners cease work (because one miner was already successful), and all copies of the blockchain 118 are updated across the peer-to-peer network to append the block to the blockchain 118. Each miner may be required to produce hundreds or thousands of hash values, before any one miner provides a qualifying hash value (e.g., at least the first four characters of the hash value are each zero).

In certain embodiments, the distributed ledger (or blockchain 118) system may include one or more sidechains. A sidechain may be described as a blockchain 118 that validates data from other blockchains 118. In certain embodiments, a sidechain enables ledger assets (e.g., a digital currency) to be transferred between multiple blockchains 118. In certain embodiments, the blockchain 118 may be a public blockchain, such that data stored on the blockchain 118 is generally accessible. In other embodiments, the blockchain 118 may be a private blockchain, such that the stored data is accessible only to authorized individuals and/or processes on the blockchain 118. In certain embodiments, the blockchain 118 may also be a hybrid of public and private blockchains. For example, the decentralized identity management system 104 may utilize a privately managed, but publicly readable blockchain 118. In this manner, some identity information about a user may be stored in a sidechain.

In certain embodiments, the decentralized identity management system 104 may store multiple different reputation scores. The scores may include a banking reliability score that may be based on bill payment history, credit card balances, savings/overdraft balances, spending patterns (binge spending indicators), bankruptcy filings, and income data. In such embodiments, a financial institution 112 may use the information to determine whether or not to provide credit and/or cash advances to the user 102.

Figure 2:
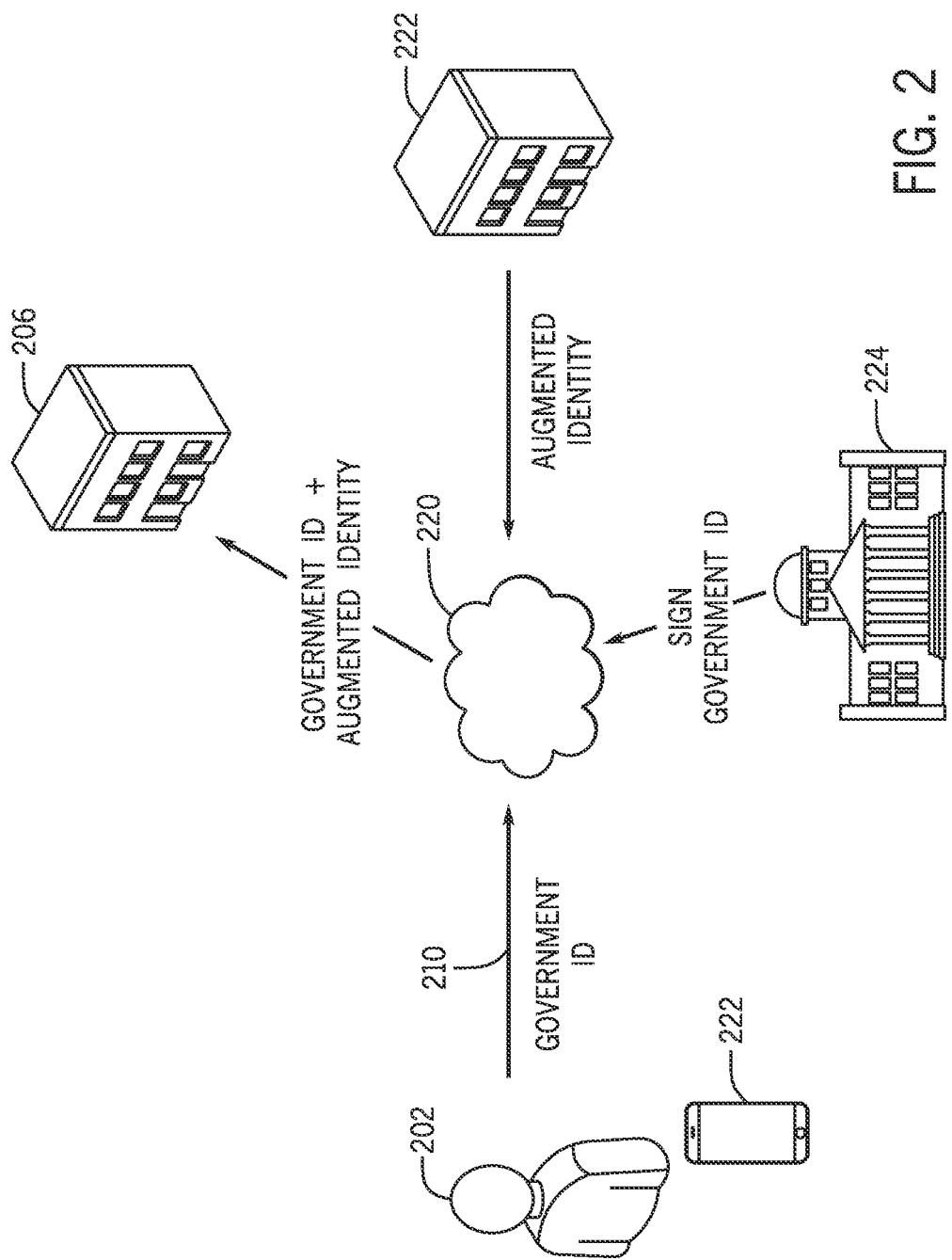
FIG. 2 illustrates an example of verifying user identification and sharing information about the user between different institutions using a decentralized identity management system, in accordance with embodiments described herein.

FIG. 2 illustrates an example of verifying a user identity and sharing information about the user between different institutions using a decentralized identity management system 220, in accordance with embodiments described herein. It will be appreciated that the decentralized identity management system 220 utilizes a distributed ledger such as a blockchain that functions similarly to the blockchain 118 of the decentralized identity management system 104 illustrated in FIG. 1. A user 202 may create a claim associated with their government identification. The claim may be verified or digitally signed by a government institution 224. The act of verifying an identification may take place in person. For example, the user 202 may need to appear in person at the government institution 224 to have their identification verified. In this manner, the risk of fraud or identity misappropriation may be reduced. The signed identification may be presented digitally to a first financial institution 222 in order to prove that the user 202 is who they claim to be. The financial institution 222 may gather additional information about the user 202. This augmented identity information may be stored in the decentralized identity management system 220. Another financial institution 206, when attempting to verify the identity of the customer 202, may use the government and augmented identity information. This may provide a substantial savings in time and computational effort because the work performed by the financial institution 222 does not have be replicated by the subsequent financial institution 206.

Figure 3:
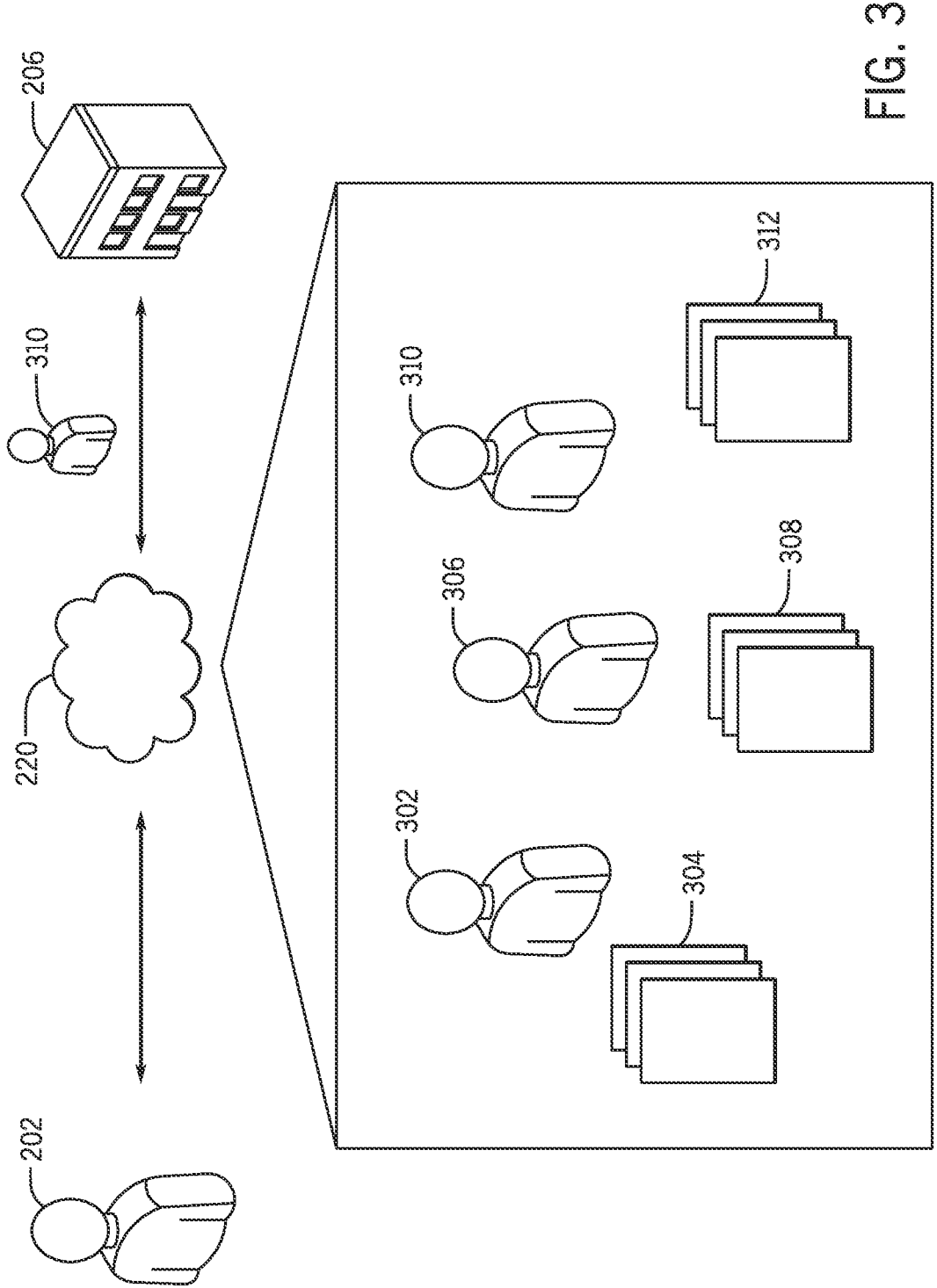
FIG. 3 illustrates an example of a user selecting between different identity profiles to provide to an institution, in accordance with embodiments described herein.

FIG. 3 illustrates an example of the user 202 selecting between different identity profiles to provide to the institution 206, in accordance with embodiments described herein. In certain embodiments, when the user 202 logs in to the decentralized identity management system 220, they may be able to select between different identity profiles that determine the kinds of information that is provided to the counterparty. In this example, the user 202 has three different identity profiles (identity profile 302 associated with identity information 304, identity profile 306 associated with identity information 308, and identity profile 310 associated with identity information 312). The identity profiles 302, 306, 310 may be displayed to the user 202, for example on a user interface of the client's device. The user 202 may select between the different identity profiles 302, 306, 310 to determine which identity profile 302, 306, 310 is provided to the institution 206. In this example, the user 202 has selected the identity profile 310 to provide to the institution 206. In this manner, the user 202 may limit the kinds of information that may be received by the institution 206.

In certain embodiments, a default identity profile 302, 306, 310 may be selected automatically by the decentralized identity management system 220 based on the counterparty. For example, financial institutions may receive one identity profile (e.g., identity profile 302), whereas merchants may receive a different identity profile (e.g., identity profile 306). In certain embodiments, the user 202 may be able to specify all the identity information that is provided to the counterparty. In certain embodiments, some of the information provided to the counterparty may be provided based on the type of the counterparty or the context in which the counterparty request information. For example, a counterparty may request specific reputation-related information about the user 202, which may be provided by default.

Figure 4:
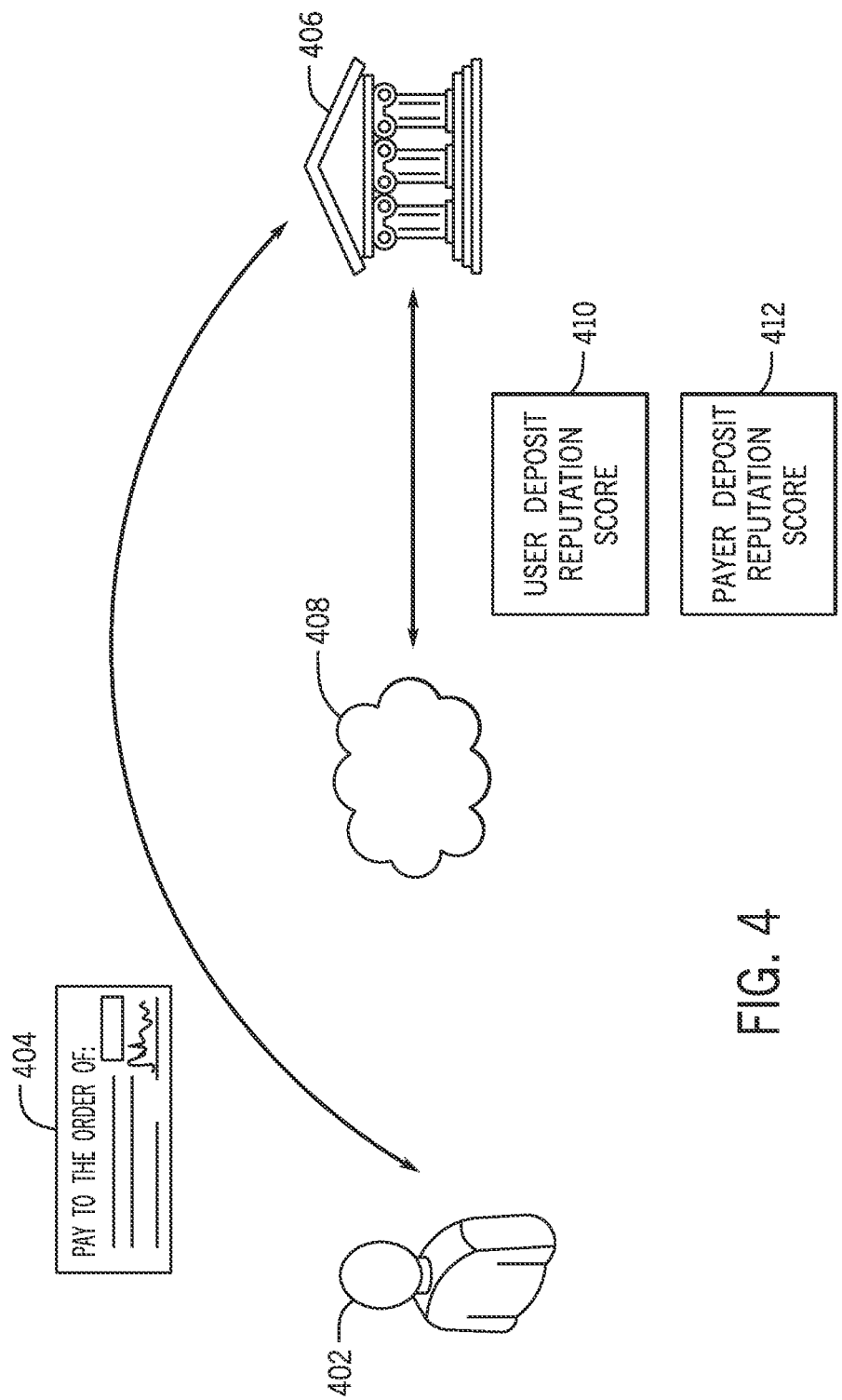
FIG. 4 illustrates an example in which an institution may request reputation information about a user, in accordance with embodiments described herein.

FIG. 4 illustrates an example in which an institution may request reputation information about a user 402, in accordance with embodiments described herein. In this example, the user 402 presents a check 404 to a bank 406. It will be appreciated that the decentralized identity management system 408 utilizes a distributed ledger such as a blockchain that functions similarly to the blockchain 118 of the decentralized identity management system 104 illustrated in FIG. 1. The user 402 authenticates with the decentralized identity management system 408. As part of the information provided by the decentralized identity management system 408, there may be a user deposit reputation score 410 that is presented to the bank 406. The user deposit reputation score 410 is indicative of how likely it is that the check 404 presented by the user 402 is valid. The user deposit reputation score 410 may be provided as part of the identity information the decentralized identity management system 408 provides about the user 402, or may be requested separately by the bank 406. In certain embodiments, the bank 406 may also receive a payer deposit reputation score 412 for the individual payer who wrote the check 404. In certain embodiments, the user deposit reputation score 410 may be determined based on user account behavior, such as the average daily balance maintained by the user 402, the number of returned checks in the last 30 days, the number of overdrafts in the last 12 months, the age of the oldest transactional deposit account, and so forth. Based on the deposit reputation score 410 of the user 402, the bank 406 may elect to make the deposited funds immediately available for withdrawal, or may determine to hold the deposit until the check 404 has cleared.

Figure 5:
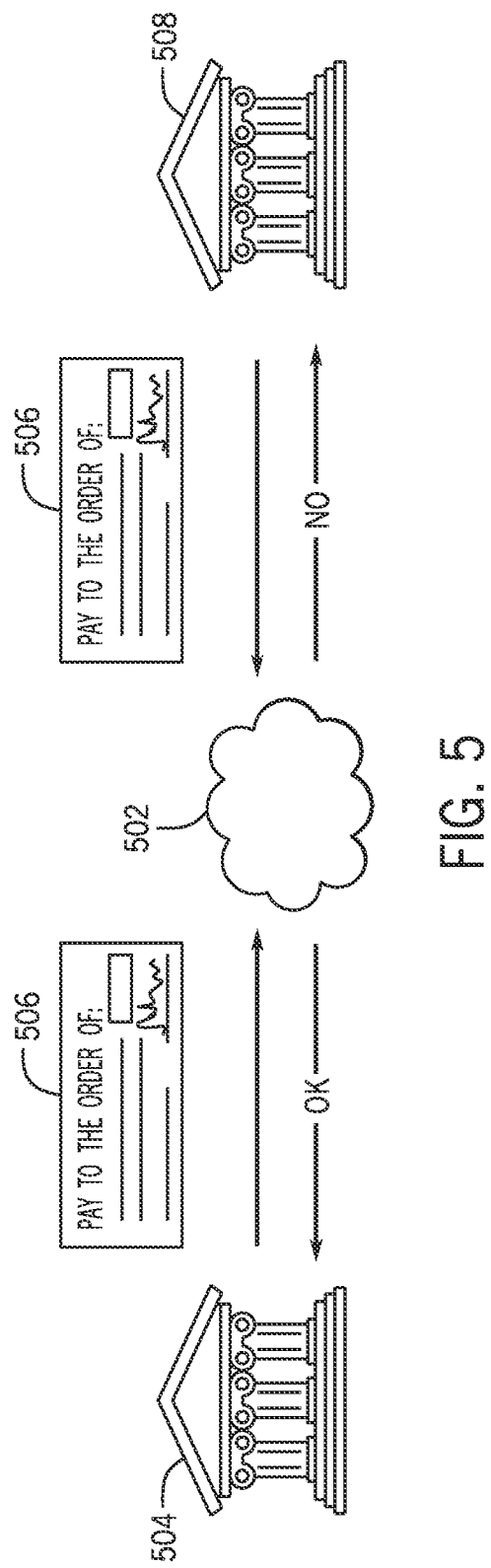
FIG. 5 illustrates an example of how a decentralized identity management system may help prevent fraud, in accordance with embodiments described herein.

FIG. 5 illustrates an example of how a decentralized identity management system 502 may help prevent fraud, in accordance with embodiments described herein. It will be appreciated that the decentralized identity management system 502 utilizes a distributed ledger such as a blockchain that functions similarly to the blockchain 118 of the decentralized identity management system 104 illustrated in FIG. 1. In this example, remote deposit applications offered by several banking institutions may run certain risks that a check may be represented within the same bank or across multiple banks. A decentralized identity management system may help mitigate this risk. In this example, a user (not shown) has presented a check 506 to a bank 504. The check 506 may be presented, for example, using a mobile deposit application on a smart device. The bank 504 sends the check information to the decentralized identity management system 502 (for example, in conjunction with receiving the user deposit reputation score, as described herein). The check information may include, for example, the routing number, the account number, and the check number. The decentralized identity management system 502 may verify that the decentralized identity management system 502 has not previously received a request for the check 506 before, or, alternatively, may check a blockchain that records checking transactions to verify that the check 506 has not been previously deposited or cashed. In this example, the decentralized identity management system 502 finds no record of the check 506 and, therefore, provides information that the check 506 is likely valid. If, at a later time, another bank 508 presents the same check 506 to the decentralized identity management system 506, the decentralized identity management system 502 determines that the check 606 has been previously presented and, accordingly, tells the other bank 508 that the check 506 is likely invalid.

Figure 6:
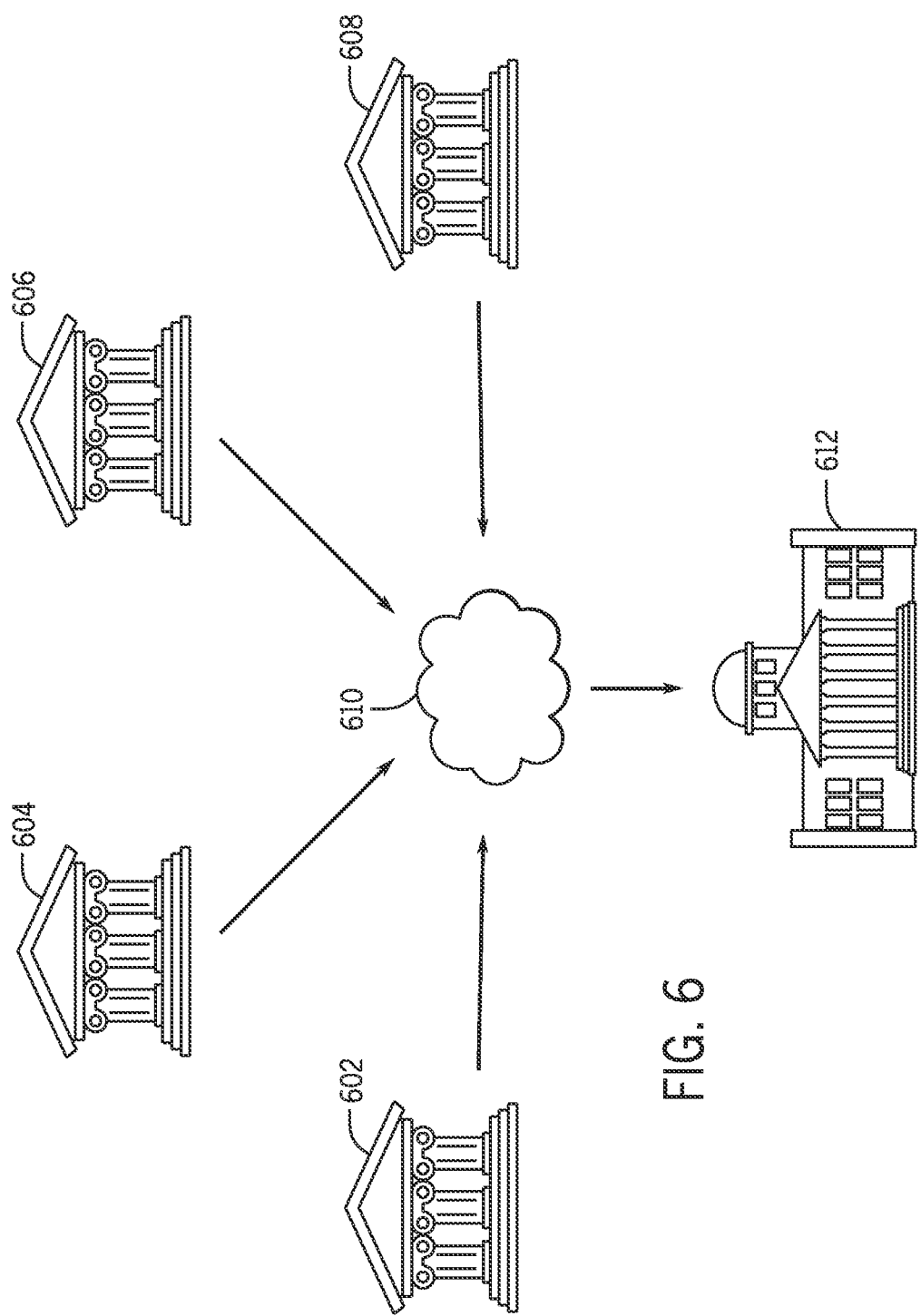
FIG. 6 illustrates an example of how a decentralized identity management system may be used to support government regulation and compliance efforts, in accordance with embodiments described herein.

FIG. 6 illustrates an example of how a decentralized identity management system 610 may be used to support government regulation and compliance efforts, in accordance with embodiments described herein. It will be appreciated that the decentralized identity management system 610 utilizes a distributed ledger such as a blockchain that functions similarly to the blockchain 118 of the decentralized identity management system 104 illustrated in FIG. 1. AML (Anti-Money Laundering) are compliance requirements mandating that when onboarding a new customer, a financial intuition needs to gather sufficient proof of the true identity of the customer—an actual physical person, and as an ongoing effort, know the customer's expected activities in order to detect any suspicious activities and money laundering. The manual process of document-gathering and verification is a bottleneck to effective KYC (Know Your Customer)/AML compliance processes. Because a user may have been previously verified by the decentralized identity management system 610, the document-gathering and verification process may be simplified (for example, the documents may be directly available from the decentralized identity management system). In certain embodiments, the KYC requirements may be met by the decentralized identity management system 610, and provided as proof to the financial institution. Furthermore, AML efforts may be assisted by consolidating transaction information across multiple financial institutions (for example, the financial institutions 602, 604, 606, and 608) with the decentralized identity management system 610. The decentralized identity management system 610 may then provide compliance or alerts to government organization(s) 612 or other watchdog groups. At the same time, information provided to the decentralized identity management system 610 may be used to detect patterns in user transactions using transaction information. Actions that diverge from the pattern may be used to detect fraudulent account takeovers.

The decentralized identity management systems 104, 220, 408, 502, 610 described herein relating to FIGS. 1-6 illustrate but some of the areas that decentralized identity management systems may be used. Another area where a decentralized identity management system may be used is to manage devices, such as IoT devices. In certain embodiments, smart contract(s) executing on a distributed ledger of the decentralized identity management system, and/or code running elsewhere, may control access to one or more IoT devices in a home or other environment. The smart contract(s) may employ information stored on the distributed ledger and information in a transaction sent to the smart contract(s) to determine whether particular user(s) and/or process(es) may access the IoT device(s), issue commands to the IoT device(s), access data generated by the IoT device(s), and/or control the IoT device(s). The smart contract(s) may provide a secure portal through which user(s) and/or service(s) may access IoT device(s) for command and control of such device(s), and secure access may be based on permission information that is specified or provided by an owner or operator of the device(s) and that is stored on the distributed ledger.

As but one non-limiting example, a homeowner may update permission information to indicate that a particular individual is to be given access to an IoT device that is a smart door lock. Based on this permission, the individual may approach the door and, using an application executing on a portable computing device (e.g., smartphone), instruct the lock to disengage and enable the door to be opened. In certain embodiments, the permission information may specify particular constraints on the access. For example, the individual may be given permission to open the door a single time, or up to N times, or only during a specified period of time (e.g., certain hours of the day, certain days of the week, etc.). Unlike traditional access code based IoT devices, the embodiments described herein provide access control in which there is no passcode that the user needs to remember, and which may be passed around or snooped. Rather, a user has access to the device provided that the user's identity is given access to that device, as recorded by the distributed ledger (e.g., in the permission information) and provided that the user successfully authenticates as their identity.

The smart contract(s) may also act as an intermediary to manage communications between the IoT device(s) and external service(s), and/or the smart contract(s) may establish trusted, secure communications with external services on behalf of the IoT device(s). Based on permission information stored on the distributed ledger, the IoT device(s) may interact with external resources and/or services, such as utility services, e-commerce services, and so forth. For example, an IoT device that consumes and/or distributes power, water, gas, and/or other resources may monitor its own status and, on detecting an abnormal operating condition, may automatically communicate with a utility company to inform the company of the abnormal operating condition. As another example, an IoT device may detect an abnormal operating condition of one of its components, and may automatically communicate, through the smart contract(s), with an e-commerce service to order a replacement component. In certain embodiments, such communications may be performed automatically by the IoT device without requiring intervention of a user.

In certain embodiments, the smart contract(s) interact with each of the individual IoT devices (e.g., as each is brought online and added to an IoT network or other network). The smart contract(s) may determine, for each IoT device, whether a particular device is a trusted and/or secure device such that the device may be added to the network and enabled for command and control. For example, the IoT device may authenticate itself with the smart contract(s), and the smart contract(s) may establish a command-and-control relationship with the IoT device that is mediated through permission information stored on the distributed ledger. Through use of the permission information stored on the distributed ledger, the smart contract(s) may ensure that communication between any trusted IoT device on the local network and external service(s) is secure and limited to authorized individuals or processes. Accordingly, certain embodiments provide and/or enhance the security and trust of an IoT ecosystem, such as a home network.

In certain embodiments, the smart contract(s) may operate as a payment and/or transaction hub or gateway for the IoT devices, such that transactions between the IoT devices and external service(s) go through the smart contract(s). For example, the smart contract(s) may include a payment component that is configured to access payment information that is securely stored on the distributed ledger. Payment information may be in some form of digital currency used to pay for transactions. In certain embodiments, each identity on the blockchain may be represented by an address, and each address may have a balance built-in, and may send and receive digital currency of that blockchain. In certain embodiments, other types of payment information may be employed such as private credit card or bank account information. Such private information may be stored off ledger, and the ledger provides secure access to such information. Payment for services or products may be made through the built-in digital currency system, or other payment information. The IoT device may request that the smart contract(s) initiate a transaction with an external service, such as a purchase of a replacement component, payment of a utility bill, and so forth. For example, an IoT device may be a lamp or light fixture, or a sensor module that monitors the lamp or light fixture. The IoT device may detect that a bulb in the lamp has burned out, and the IoT device may execute transactions through smart contract(s) to order and pay for a new replacement bulb from an online retailer. In certain embodiments, such transactions may be initiated automatically without requiring user intervention, after an authorized user (e.g., device owner) has initially set up the payment information and authorized the smart contract(s) to automatically perform such transactions.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to access IoT device(s) and/or constraints on such access. The interface may also enable the user to view information such as IoT device statuses and/or request history that is stored on the distributed ledger. In certain embodiments, a request history may provide an auditable history of requests to and from the IoT device(s), which are mediated by the smart contract(s) on the distributed ledger.

In certain embodiments, the smart contract(s) may enable authorized individuals to control one or more IoT devices, such as mechanisms of the home or other structures. For example, as but one non-limiting example, the smart contract(s) may communicate over one or more (e.g., wired or wireless) networks with one or more lock mechanisms for doors in the home. Smart contracts may execute on a peer-to-peer (P2P) network of a pool of computers connected to the Internet through a wireless and/or wired connection. Certain devices (e.g., locks) may connect to this P2P network through a wireless and/or wired connection. The smart contract(s) may be accessed and/or communicated with on the distributed ledger and/or the P2P network where it resides. This P2P network may be accessed through one or more networks of any suitable type. In certain scenarios, a user (e.g., device owner, home owner, etc.) may grant permission to a service person (e.g., plumber, HVAC repair person, etc.) to access the home a particular number of times and/or during a particular period of time, and such permission may be specified in the permission information stored on the distributed ledger. When a service person approaches the door to gain access to the home, the smart contract(s) may receive an indication of the detected presence of the service person in proximity to the door, verify that the service person is authorized for access (based on the permission information), and open the door. In certain embodiments, the detection of the person at the door is an application function that is performed outside the distributed ledger (e.g., driven by cameras installed at the door that notifies a mobile app). In certain scenarios, a homeowner may initiate a command that causes the execution of the smart contract on the distributed ledger to enable the lock software to open the lock. As another example, in certain embodiments, a biometric wearable device that the service person wears could be automatically verified by an application (e.g., outside the distributed ledger) and the application may initiate a ledger smart contract. In certain embodiments, the smart contract(s) may also perform other actions, such as provide payment to the service person, coordinate a real-time communication (e.g., video chat) session between the service person and the homeowner, and so forth.

The smart contract(s) executing on a distributed ledger may make access authorization decisions based on permission information stored on the distributed ledger. In certain embodiments, the distributed ledger may be a blockchain. The IoT devices may include, but are not limited to, one or more of the following: smart appliances (e.g., washers, dryers, refrigerators, ovens, dishwashers); home entertainment systems (e.g., televisions, audio systems, game consoles, media players, etc.); in-home control systems (e.g., garage door openers, alarm systems, security systems, smart home systems); lighting devices (e.g., lamps, fixtures, etc.); utility systems that provide and/or control electric power, gas, water, sewage, heating and air conditioning, network access, and so forth (e.g., water meters, water heaters, gas meters, electrical switch boxes, circuit breaker boxes, etc.); and/or portable or less portable computing devices (e.g., smartphones, tablet computers, electronic book readers, gaming systems, laptop computers, desktop computers, television set-top boxes, in-vehicle automotive computers or telematics devices, etc.).

Figure 7:
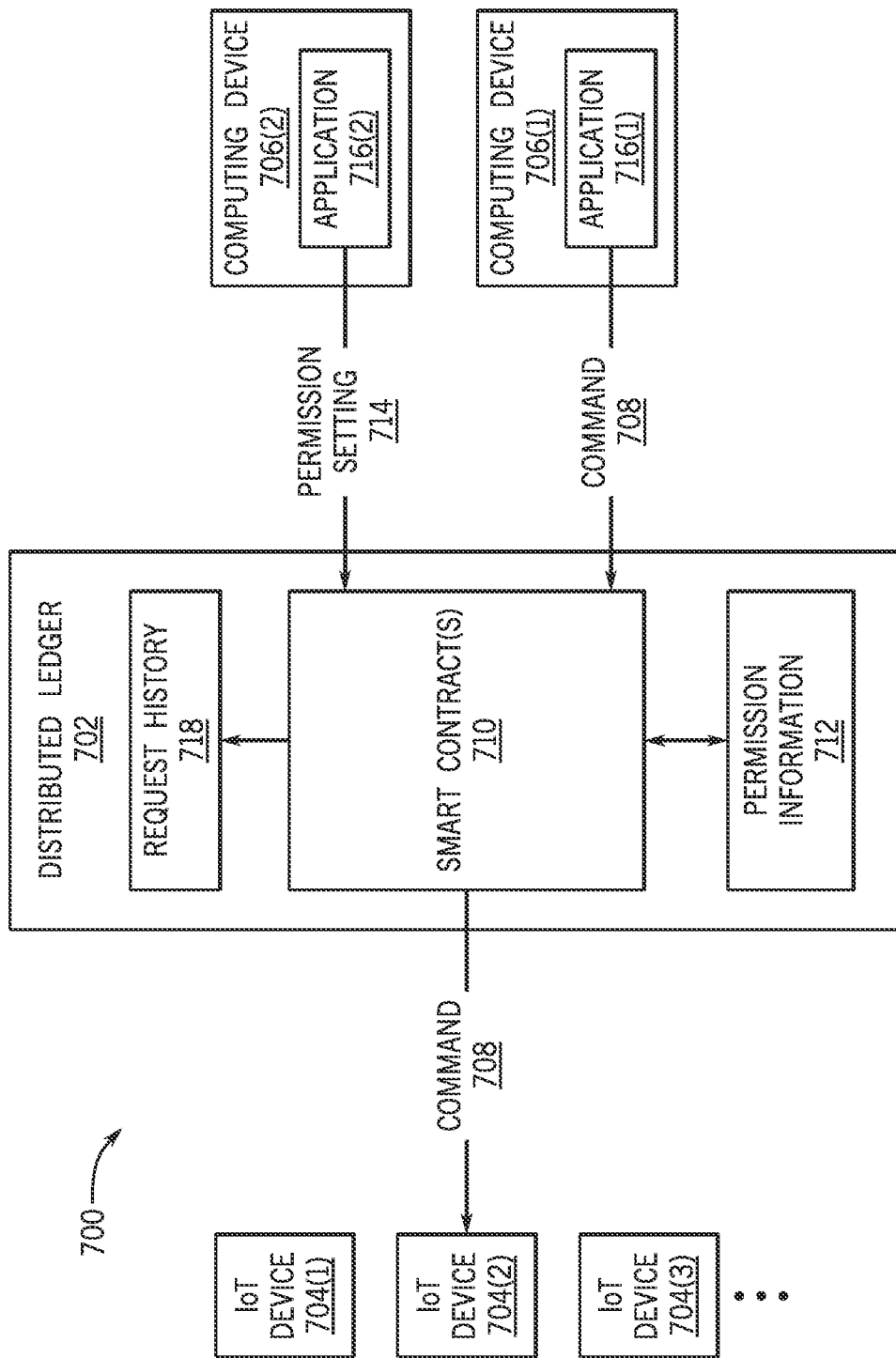
FIG. 7 illustrates an example decentralized identity management system for device management, in accordance with embodiments described herein.

FIG. 7 illustrates an example decentralized identity management system 700 for device management, in accordance with embodiments described herein. As illustrated, in certain embodiments, the decentralized identity management system 700 includes a distributed ledger 702. In certain embodiments, the distributed ledger 702 is a blockchain that functions similarly to the blockchain 118 described above with respect to the decentralized identity management systems described with respect to FIGS. 1-6. In certain embodiments, the distributed ledger 702 may store information on any suitable number of nodes that are distributed across any suitable number of computing device(s). The decentralized identity management system 700 also includes a plurality of IoT devices 704, such as IoT devices 704(1), 704(2), and 704(3), as illustrated in FIG. 7. Certain embodiments support the management of any suitable number of IoT device(s) 704. In certain embodiments, the IoT device(s) 704 may be located in or near a same building, such as a house, office building, and so forth. In certain embodiments, the IoT device(s) 704 may communicate with one another, and/or with other computing devices, over one or more networks that are wired and/or wireless networks. For example, in certain embodiments, the IoT device(s) 704 may communicate over a wireless network that enables radiofrequency communications according to a version of an IEEE 802.11 protocol (e.g., a WiFi network), a version of Bluetooth™ and/or Bluetooth Low Energy (BLE)™ protocol, a Near Field Communication (NFC) protocol, and so forth.

In certain embodiments, the decentralized identity management system 700 may also include various other computing devices 706, such as the computing devices 706(1) and 706(2) as illustrated in FIG. 7. The computing devices 706 may be any suitable type of computing devices. In certain embodiments, the computing devices 706 include portable computing devices (e.g., mobile devices), such as a smartphone, tablet computer, wearable computing device (e.g., wristwatch- or glasses-configured computer), and so forth. One or more of the computing devices 706 may execute an application 716. In certain embodiments, the application 716 is a mobile app configured to execute on a portable computing device such as a smartphone.

In certain embodiments, a user of the computing device 706(1), also described as a user device or requesting user device, may use the application 716(1) to request that a command 708 be sent to a particular IoT device 704. For example, as but one non-limiting example, a user may approach a door to a house and request that a command be sent to instruct an IoT door lock mechanism to unlock the door and permit entry to the house. As another non-limiting example, a user may approach a smart utility controller and request that a command be sent to access data generated by the controller. As another non-limiting example, a user may approach a vehicle and request that a command be sent to unlock the vehicle door and/or start the engine of the vehicle.

In certain embodiments, the command 708 may be received by a smart contract 710 executing on the distributed ledger 702. In certain embodiments, the smart contract 710 may access permission information 712 stored on the distributed ledger 702 and, based on the permission information 712, decide whether to forward the command 708 to the target IoT device 704. If the permission information 712 indicates that the user of the requesting device 706, the requesting device itself, and/or the application 716 executing on the requesting device 706 is authorized to send commands to the particular targeted IoT device 704, the command 708 may be forwarded to the IoT device 704. In certain embodiments, the permission information 712 may specify certain constraint(s) governing the access of the requesting device 706, requesting user, and/or requesting application 716 to the IoT device 704. In such instances, in certain embodiments, the smart contract 710 may verify that the constraint(s) are satisfied before sending the command 708 on to the particular targeted IoT device 704. In other embodiments, the smart contract 710 may verify that the constraint(s) are satisfied before enabling the requesting device 706, requesting user, and/or requesting application 716 to send the command 708 directly to the targeted IoT device 704. For example, in such embodiments, instead of directly sending the command 708 directly to the targeted IoT device 704, the smart contract 710 may instead enable transmission of the command 708 from the requesting device 706, requesting user, and/or requesting application 716 to the IoT device 704 by, for example, notifying the requesting device 706, requesting user, requesting application 716, and/or the IoT device 704 that the command 708 has been allowed.

In certain embodiments, the IoT device 704 may execute the command 708 and provide a response that indicates the result of executing the command 708 (e.g., command success, command failure, and so forth). In certain embodiments, the result may be communicated back to the requesting device 706 through the smart contract 710, and the result may be presented to the requesting user through a user interface (UI) of the requesting device 706. In certain embodiments, the forwarding of the command to the IoT device 704, through the smart contract 710, may establish a communications session between the requesting device 706 and the IoT device 704. For example, following the initial verification by the smart contract 710 that the requesting user, device 706, and/or application 716 are permitted to communicate with the IoT device 704, and/or verification that any relevant constraint(s) are satisfied, the requesting device 706 and IoT device 704 may establish a connection, either directly or through the smart contract 710 as an intermediary, and use the connection to exchange any appropriate number of subsequent communications.

In certain embodiments, the distributed ledger 702 may store a request history 718 that describes the various commands 708 and/or other communications that may be sent to and/or from IoT devices 704 through the distributed ledger 702 of the decentralized identity management system 700, using the smart contract 710 as an intermediary. The smart contract 710 may update the request history 718 to describe the requests received from computing device(s) 706 to send command(s) 708 to IoT device(s) 704, whether such requests are allowed or denied by the smart contract 710.

In certain embodiments, a smart contract 710 may be associated with a particular user who is an owner (e.g. stored in the decentralized identity management system 700 as part of the user's identity), or otherwise responsible for, the IoT device(s) 704. In certain embodiments, the distributed ledger 702 of the decentralized identity management system 700 may execute any number of smart contracts 710, each of which is associated with a particular owner of a set of IoT devices 704. In certain embodiments, an owner may use a computing device 706(2), and/or an application 716(2) executing on the computing device 706(2), to send one or more permission settings 714 to update the permission information 712 for the IoT device(s) 704 that are associated with that owner. The smart contract 710 may receive the permission setting(s) 714, verify whether the owner is authorized to update the permission information 712 and, if so, update the permission information 712 to include the permission setting(s) 714. In this way, an owner of IoT device(s) 704 may control which users are allowed to access which IoT device(s) 704 (e.g., send command(s) to the IoT device(s) 704) and what constraints (if any) are to govern such access.

Figure 8:
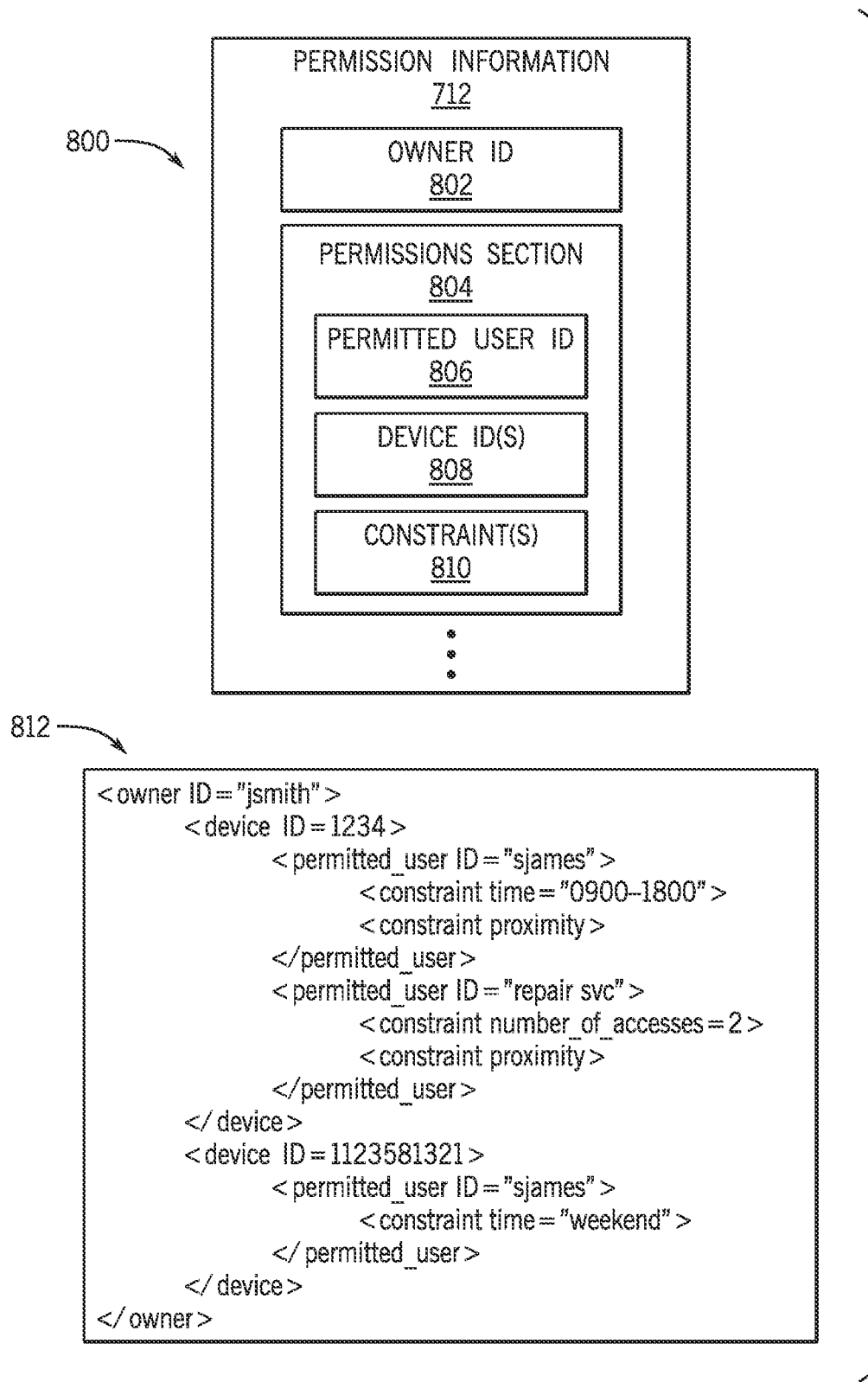
FIG. 8 illustrates an example schematic of permission information for device management, in accordance with embodiments described herein.

FIG. 8 illustrates an example schematic 800 of the permission information 712 for device management, in accordance with embodiments described herein. The permission information 712 may include any suitable number of sets of permission information, with each set of permission information corresponding to a particular owner of a set of IoT devices 704 to be managed. In certain embodiments, a set of permission information 712 may include an owner identifier (ID) 802 that identifies the owner user. The owner ID 802 may be a username, personal name, identification number, account name, and/or other any suitable ID that uniquely identifies the owner among a population of users.

In certain embodiments, the permission information 712 may also include any number of sections 804 that each correspond to a user who is permitted to access (e.g., send commands to) one or more of the IoT devices 704 associated with the owner. Each section 804 may include a permitted user ID 806 that identifies the particular permitted user. The permitted user ID 806 may be a username, personal name, identification number, account name, and/or other any suitable ID that uniquely identifies the user among a population of users. The section 804 may also list any suitable number of device IDs 808 that identify the IoT device(s) 704 to which the permitted user is given permission to access. A device ID 808 may be a device name, identification number, network address, media access control (MAC) address, Uniform Resource Identifier (URI), and/or other suitable identifier.

In certain embodiments, one or more of the device ID(s) 808 may be associated, in the section 804, with one or more constraints 810 that govern the access of the permitted user to the particular IoT device 704. As described herein, in certain embodiments, such constraint(s) 810 may include location-based constraints, such as requiring the requesting device 706 to be in proximity to the IoT device 704. In certain embodiments, the constraint(s) 810 may also include time-based constraints, such as requiring that the request for access be sent within a particular period of time indicated in the constraint (e.g., a particular time of day, particular days of the week or month, a designated range of dates and/or times, and so forth). In certain embodiments, the constraint(s) 810 may also include constraints on number of requested accesses, such as permitting a particular user to send N commands 708 to a particular IoT device 704, during a particular time period or unconstrained with respect to date/time.

FIG. 8 also illustrates a particular non-limiting example 812 of permission information 712. The example 812 depicts permission information 712 organized in an Extensible Markup Language (XML) format. In the illustrated example, a user with a user ID 806 of "sjames" may access an IoT device with a device ID 808 of 12434 during the times of 9:00 AM to 6:00 PM when in proximity to the particular IoT device. In addition, a user with a user ID 806 of "repair svc" may access the IoT device with the device ID 808 of 12434 twice when in proximity to the particular IoT device. In addition, the user with the user ID 806 of "sjames" may access an IoT device with a device ID 808 of 1123581321 during weekends. Certain embodiments also support the use of any other suitable format for the permission information 712.

Figure 9:
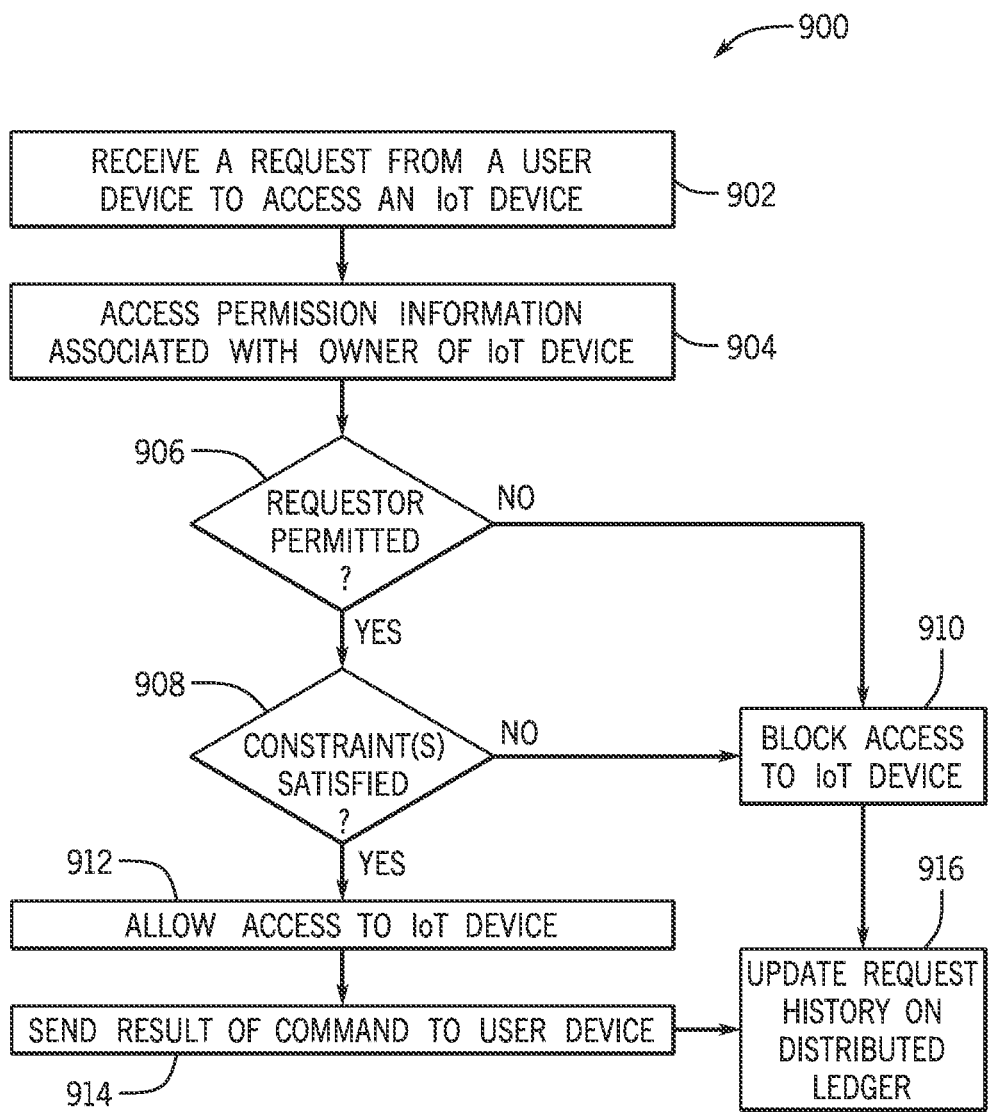
FIG. 9 illustrates a flow diagram of an example process for managing commands sent to one or more devices, in accordance with embodiments described herein.

FIG. 9 illustrates a flow diagram of an example process 900 for managing commands sent to the device(s) 704, in accordance with embodiments described herein. Operations of the process 900 may be performed by one or more of the smart contract(s) 710, the application(s) 716, and/or other software processes executing on the computing device(s) 706, the IoT device(s) 704, the distributed ledger 702 of the decentralized identity management system 700, and/or elsewhere.

In certain embodiments, a request may be received (902) from a user device 706, requesting to send a command to otherwise access a particular IoT device 704, also described as the target IoT device. As described herein, the request may be received through the smart contract 710 that executes on the distributed ledger 702 of the decentralized identity management system 700. In certain embodiments, the request includes an ID of the requesting user, such as a username. In certain embodiments, both the requesting user and the owner of the IoT device(s) 704 may have previously registered with a device management service, and the user IDs of the requesting user and owner may be issued by the device management service.

In certain embodiments, the smart contract 710 may access (904) the permission information 712 that is associated with an owner of the target IoT device 704. Based on the permission information 712, a determination is made (906) whether the requestor (e.g., the requesting user) is permitted to access the target IoT device 704 and, thus, whether the computing device 706 of the requesting user is permitted to issue commands to the target IoT device(s) 704. In certain embodiments, determining that the computing device 706 is permitted to issue the command to the IoT device 704 is further based on authenticating the user of the device 706. Such authentication may use any suitable authentication mode. In certain embodiments, authentication may be based on verifying one or more credentials provided by the requesting user, such as a username, password, personal identification number (PIN), and so forth. In certain embodiments, authentication may be based on a biometric authentication mode, in which biometric data is collected from the requesting user and compared to previously collected biometric data of the user, to verify that the user is who they purport to be. Such biometric data may include, but is not limited to, fingerprint image(s), retinal image(s), image(s) of the user's face or other body portions (e.g., for facial recognition), voice print recognition, data describing the user's heartbeat, pulse, brainwave activity, galvanic skin response, body tremor, gait, electrical impedance, and so forth. In certain embodiments, the biometric data may be collected by sensor(s) integrated into the device 706 being used to make the request.

If the requestor is permitted, a determination may be made (908) whether any constraint(s) 810 on the access are satisfied, such as the constraint(s) 810 that govern the particular requesting user's access to the target IoT device 704. If it is determined that the requesting user is not permitted to access the target IoT device 704, or that the constraint(s) 810 on such access are not satisfied, the access may be blocked (910) and the command may not be forwarded to the target IoT device 704. Conversely, in certain embodiments, if it is determined that the requesting user is permitted to access the target IoT device 704, and that any constraint(s) 810 on such access are satisfied, the access may be allowed (912) and the command may be forwarded to the target IoT device 704. In other embodiments, the smart contract 710 may instead notify the IoT device 704 and the computing device 706 that the command is allowed, which may enable the computing device 706 to transmit the command directly to the IoT device 704 (e.g., instead of the smart contract 710 forwarding the command). In either case (blocked or allowed), in certain embodiments, the smart contract 710 may update (916) the request history 718 on the distributed ledger 702 of the decentralized identity management system 700 to indicate whether the requested access was blocked or allowed.

Figure 10:
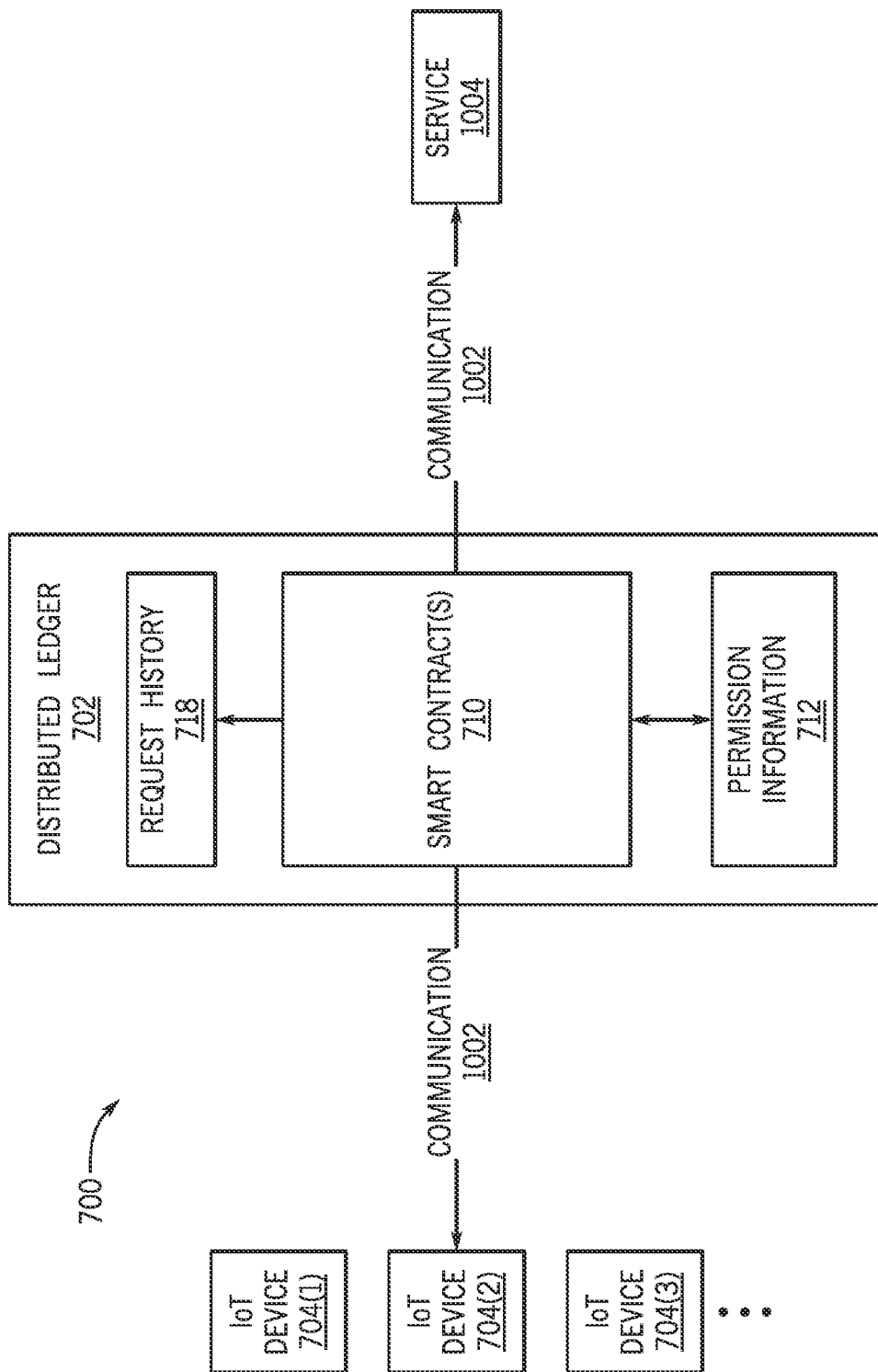
FIG. 10 illustrates the decentralized identity management system for device management, in accordance with embodiments described herein.

FIG. 10 illustrates the decentralized identity management system 700 for device management, in accordance with embodiments described herein. As described herein, in certain embodiments the smart contract(s) 710 may manage outgoing communications sent from the IoT device(s) 704, in addition to or instead of managing incoming commands or other access to the IoT device(s) 704. As illustrated in the example of FIG. 10, an IoT device 704 may attempt to send a communication 1002 to an external service 1004. In certain embodiments, the communication 1002 may be an attempted transaction, such as a purchase transaction or a request that payment be sent to some external entity. For example, a smart light fixture may determine that its light bulb has burned out and, in response to such a determination, the fixture may automatically attempt to purchase a replacement bulb from an external e-commerce service. The smart contract 710 may receive the communication 1002 and check whether the permission information 712 indicates that the communication 1002 is allowed or disallowed. If the communication 1002 is allowed, in certain embodiments, the smart contract 710 may transmit the communication 1002 on to its intended destination (e.g., network address of the service 1004). In other embodiments, the smart contract 710 may instead notify the IoT device 704 and the service 1004 that the communication 1002 is allowed, which may enable the IoT device 704 to transmit the communication 1002 directly to the service 1004. Conversely, if the communication 1002 is not allowed, the smart contract 710 may block the communication 1002. In either case, in certain embodiments, the smart contract 710 may update the request history 718 to indicate that the communication 1002 was attempted, and to indicate whether the communication 1002 was allowed or blocked.

Figure 11:
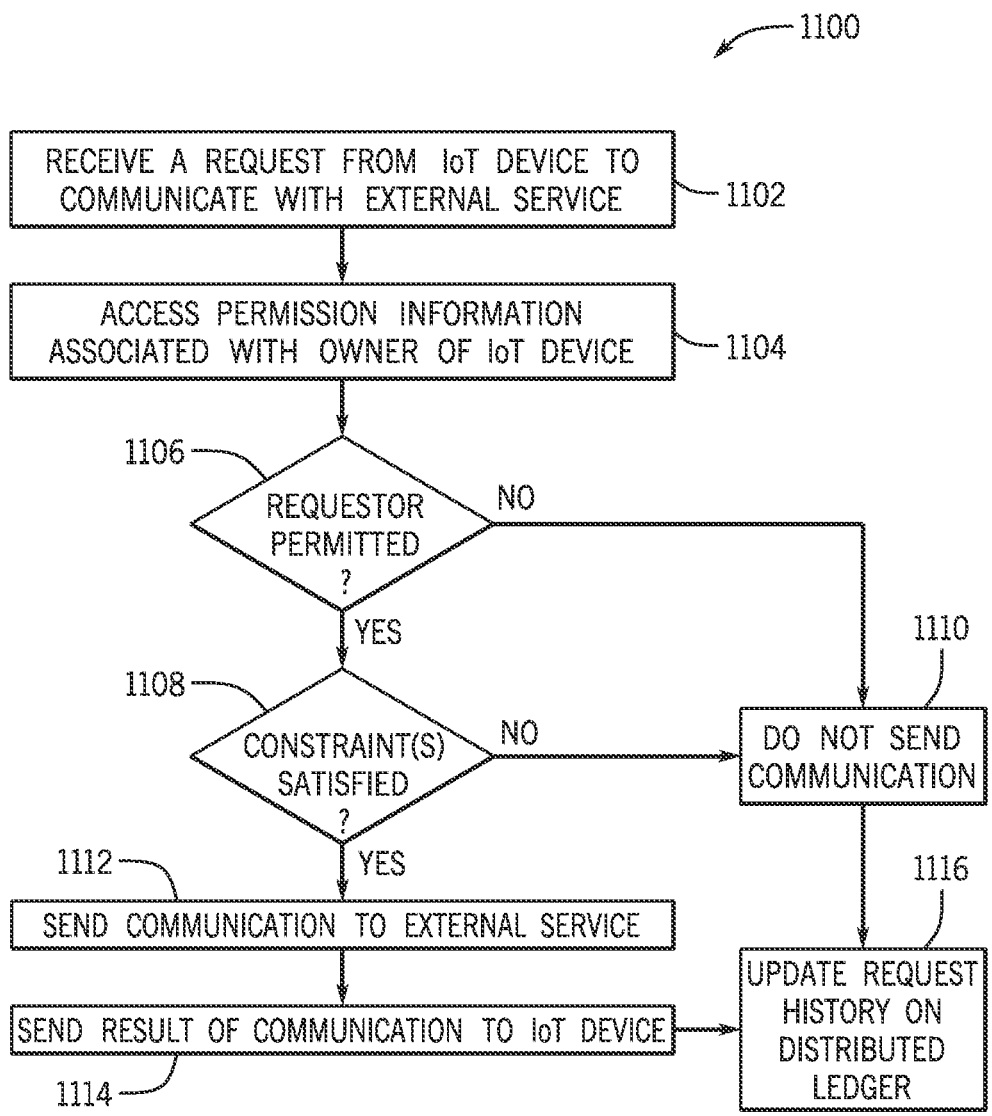
FIG. 11 illustrates a flow diagram of an example process for managing communications sent from devices, in accordance with embodiments described herein.

FIG. 11 illustrates a flow diagram of an example process 1100 for managing communications sent from devices 704, in accordance with embodiments described herein. Operations of the process 1100 may be performed by one or more of the smart contract(s) 710, the application(s) 716, and/or other software processes executing on the computing device(s) 706, the IoT device(s) 704, the distributed ledger 702 of the decentralized identity management system 700, and/or elsewhere. In certain embodiments, a request may be received (1102) from an IoT device 704, requesting to send a communication to an external service 1004 over a network (e.g., the Internet). In certain embodiments, the request may be received through the smart contract 710 that executes on the distributed ledger 702 of the decentralized identity management system 700. In certain embodiments, the request includes an ID of the requesting IoT device 704.

In certain embodiments, the smart contract 710 may access (1104) the permission information 712 that is associated with an owner of the IoT device 704 that is attempting the communication 1002. Based on the permission information 712, a determination may be made (1106) whether the requestor (e.g., the requesting IoT device 704) is permitted to communicate with the particular external service 1004, or is permitted to communicate with external services generally. If the requestor is permitted, a determination may be made (1108) whether any constraint(s) 810 on the access are satisfied, such as the constraint(s) 810 that govern the particular requesting IoT device's communications with the particular external service 1004. For example, certain IoT device(s) 704 may be permitted to communicate with certain external service(s) 1004 (e.g., identified by URL or other network location) but not with other external service(s). As another example, an IoT device 704 may be permitted to send certain types of communication to a service 1004 (e.g., requests for information that does not involve a purchase), but may be blocked from sending other types of communications (e.g., purchase transactions).

If it is determined that the requesting IoT device 704 is not permitted to send the communication 1004, or that the constraint(s) 810 on such communications are not satisfied, the communication may be blocked (1110) and not sent to the external service 1004. Conversely, if it is determined that the requesting IoT device 704 is permitted to communicate with the external service 1004, and that any constraint(s) 810 on such communications are satisfied, the communication may be allowed (1112) and may be forwarded to the external service 1004. In either case (blocked or allowed), in certain embodiments, the smart contract 710 may update (1116) the request history 718 on the distributed ledger 702 of the decentralized identity management system 700 to indicate whether the requested communication 1002 was blocked or allowed.

Figure 12:
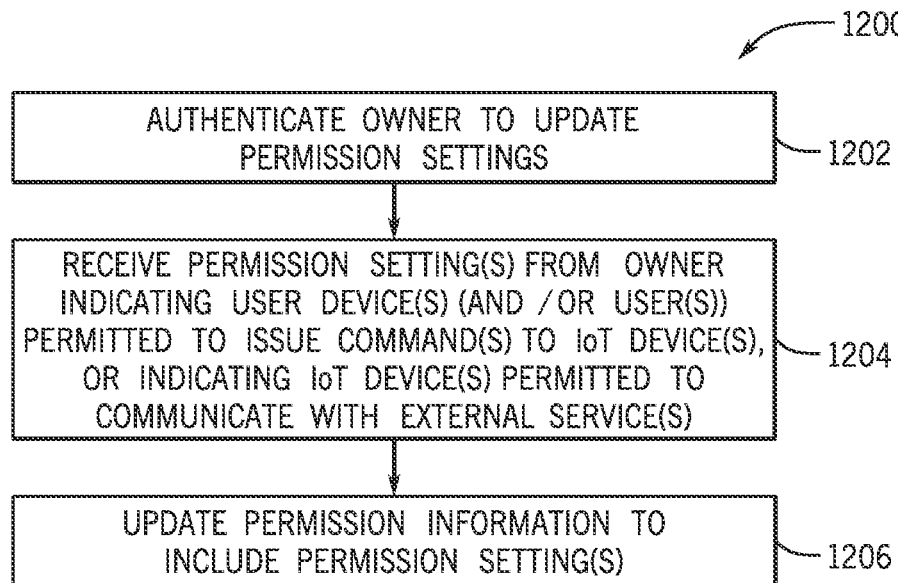
FIG. 12 illustrates a flow diagram of an example process for setting permission information for device management, in accordance with embodiments described herein.

FIG. 12 illustrates a flow diagram of an example process 1200 for setting permission information for device management, in accordance with embodiments described herein. Operations of the process 1200 may be performed by one or more of the smart contract(s) 710, the application(s) 716, and/or other software processes executing on the computing device(s) 706, the IoT device(s) 704, the distributed ledger 702 of the decentralized identity management system 700, and/or elsewhere. In certain embodiments, an owner of a set of IoT device(s) 704 may use the application 716 executing on their computing device 706 to update the permission information 712 governing access to their set of IoT device(s) 704 and/or governing the communications that may be sent from their set of IoT device(s) 704 to external service(s) 1004. In certain embodiments, the owner may be authenticated (1202) to request such updates, based on credentials provided by the application 716. Such credentials may include a username, password, personal identification number (PIN), biometric information (e.g., fingerprint, facial recognition, voice print identification, etc.), and/or other suitable types of credential(s).

Following successful authentication, the owner may specify permission setting(s) 714 to update the permission information 712, and such permission setting(s) 714 may be received (1204) by the smart contract 710. The smart contract 710 may update (1206) the permission information 712 to include the permission setting(s) 714. Permission setting(s) 714 may specify new user(s) to be given access to IoT device(s) 704, remove previously granted access to certain user(s), update the particular IoT device(s) 704 that user(s) are able to access, and/or update the particular constraint(s) 810 on access to IoT device(s) 704.

In certain embodiments, the use of a hierarchical deterministic (HD) wallet to organize the IoT devices 704 belonging to the same owner allows device-to-device communication based on ownership. By using an HD wallet to generate and/or organize the addresses assigned to a user's IoT devices 704, certain embodiments may determine whether two addresses belong to the same wallet, and thus to the one owner. This allows for device-to-device communication (for command and/or control between devices 704 owned by the same user) without the owner explicitly specifying permissions for such communications in the ledger. In certain embodiments, a user's IoT device system may be set up such that a device 704 automatically accepts transactions from another device 704 if the former can determine that the latter's address belongs to the same HD wallet. For a large IoT device system with many devices 704, the number of possible device-to-device communication pairings may be large and, if provisioned as permission rules, would take up a significant amount of storage on the blockchain, which may be relatively expensive. Certain embodiments may use this particular property of the HD wallet to avoid the need for such storage. For example, in certain embodiments, a user's car may automatically communicate with the user's garage door opener, which then communicates with several devices customizing the internal home space for that user (e.g., to set temperatures, play music, etc.). Different homeowners may have different customized home settings as appropriate.

Figure 13:
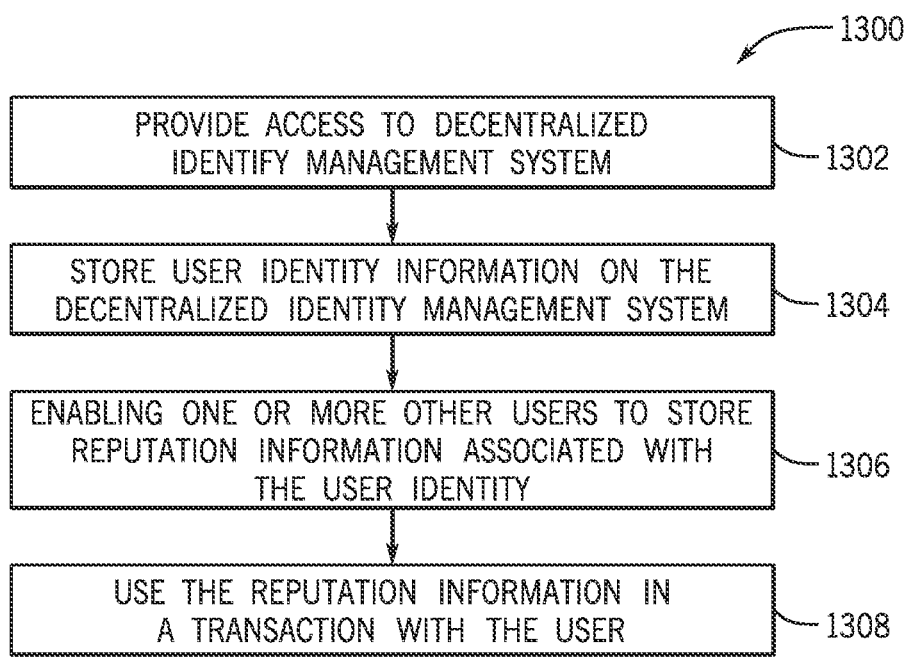
FIG. 13 is a flowchart of an example process for managing identity with a decentralized identity management system, in accordance with embodiments described herein.

FIG. 13 is a flowchart of an example process 1300 for managing identity with the decentralized identity management system 700, in accordance with embodiments described herein. Operations of the process 1300 may be performed by one or more of the smart contract(s) 710, the application(s) 716, and/or other software processes executing on the computing device(s) 706, the IoT device(s) 704, the distributed ledger 702 of the decentralized identity management system 700, and/or elsewhere. In certain embodiments, the process 1300 provides (1302) access to the decentralized identity management system 700 to a user. In certain embodiments, the process 1300 may provide access to the decentralized identity management system 700 after authenticating the identity of the user, for example, using a username and password, biometric authentication, and/or multi-factor authentication. In certain embodiments, the user may be authenticated with a third party that has a predetermined relationship with the decentralized identity management system 700. For example, in certain embodiments, the user may authenticate with a financial institution, as described above, and the financial institution may then provide authenticated access to the decentralized identity management system 700.

In certain embodiments, the process 1300 stores (1304) user identity information on the decentralized identity management system 700. In certain embodiments, a user may create an identity on the decentralized identity management system 700. In certain embodiments, the user's identity may be verified by a third party, as described above. For example, in certain embodiments, a state department of motor vehicles may verify the user's identity and verify that the user possesses a driver's license. Similarly, in certain embodiments, a State Department may verify the user's identity and verify that the user possesses a passport. In certain embodiments, the third party may only verify the user's identity based on an in-person interview. For example, in certain embodiments, the user may present their identification to an official, and the official may verify that the user is who they claim to be.

In certain embodiments, the process 1300 enables (1306) one or more other users to store reputation information associated with the user identity. Information about the user may be added to the user, or made available when someone is attempting to determine information about the user. For example, the user may possess a credit score, a job history, a financial history, diplomas, certifications, etc. In certain embodiments, the process 1300 uses (1308) reputation information in a transaction with the user. The reputation information may be used, for example, to determine whether to extend credit to the user, to trust the user to fulfill an agreement, to offer the user employment, etc.

It will be appreciated that, in addition to enabling a decentralized identity management system 700 that facilitates control of IoT Devices 704, the embodiments described herein may enable the decentralized identity management system 700 to interact with other blockchain-based systems, such as financial systems, healthcare systems, government systems, and so forth, as described in greater detail herein.

Figure 14:
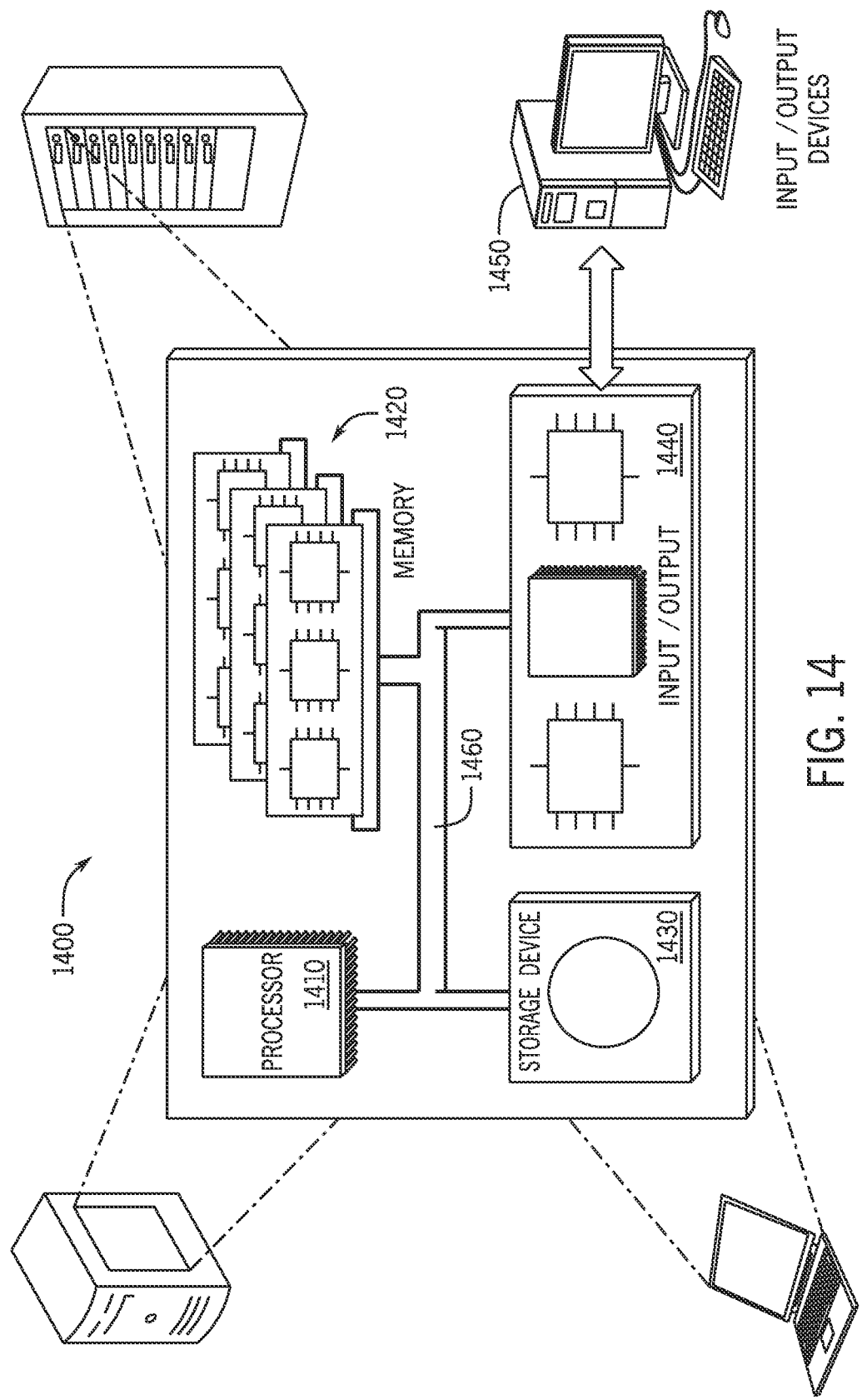
FIG. 14 illustrates an example computing system, in accordance with embodiments described herein.

FIG. 14 illustrates an example computing system 1400, in accordance with embodiments described herein. The system 1400 may be used for any of the operations described with respect to the various embodiments described herein, including the decentralized identity management system 700 described herein. For example, the system 1400 may be included, at least in part, in one or more of the computing device(s) 706, the IoT device(s) 704, and/or other computing device(s) or system(s) described herein. In certain embodiments, the system 1400 may include one or more processors 1410, one or more memory 1420, one or more storage devices 1430, and one or more input/output (I/O) devices 1450 controllable via one or more I/O interfaces 1440. The various components 1410, 1420, 1430, 1440, or 1450 may be interconnected via at least one system bus 1460, which may enable the transfer of data between the various modules and components of the system 1400.

In certain embodiments, the processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. For example, the processor(s) 1410 may execute instructions for the various software module(s) described herein. The processor(s) 1410 may include hardware-based processor(s) each including one or more cores. The processor(s) 1410 may include general purpose processor(s), special purpose processor(s), or both.

In certain embodiments, the memory 1420 may store information within the system 1400. In certain embodiments, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In certain embodiments, the memory 1420 may be employed as active or physical memory by one or more executing software modules.

In certain embodiments, the storage device(s) 1430 may be configured to provide (e.g., persistent) mass storage for the system 1400. In certain embodiments, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In certain embodiments, the CRSM may include a data store that provides storage of computer-readable instructions or other information in a non-transitory format. The CRSM may be incorporated into the system 1400 or may be external with respect to the system 1400. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 1410 and the memory 1420 may be supplemented by, or incorporated into, one or more application-specific integrated circuits (ASICs).

In certain embodiments, the system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1400 or may be external on one or more computing devices of the system 1400.

In certain embodiments, the system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-832 standard for serial ports, or with a version of the IEEE AA884 standard for parallel ports. As another example, the I/O interface(s) 1440 may be configured to provide a connection over Universal Serial Bus (USB) or Ethernet. In certain embodiments, the I/O interface(s) 1440 may be configured to provide a serial connection that is compliant with a version of the IEEE AA994 standard.

In certain embodiments, the I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more communication networks using any network protocol.

Computing devices of the system 1400 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 1400 that includes a back-end component, e.g., as a data server, or that includes a middleware component, e.g., an application server, or that includes a front-end component, e.g., a client computer having a graphical user interface or a web browser through which a user may interact with an with the system 1400, or any appropriate combination of one or more such back-end, middleware, or front end components. The components of the system 1400 may be interconnected by any appropriate form or medium of digital data communication, e.g., a communication network. Examples of communication networks include a local area network ("LAN") and a wide area network ("WAN"), e.g., the Internet.

In certain embodiments, the computing system 1400 may include clients and servers. A client and server are generally remote from each other and typically interact through a communication network. The relationship of client and server arises by computer programs running on the respective computers and having a client-server relationship to each other.

While this disclosure contains many specifics, these should not be construed as limitations on the scope of the disclosure or of what may be claimed, but rather as descriptions of features specific to particular embodiments. Certain features that are described in this disclosure in the context of separate embodiments may also be implemented in combination in a single embodiment. Conversely, various features that are described in the context of a single embodiment may also be implemented in multiple embodiments separately or in any suitable sub-combination. Moreover, although features may be described herein as acting in certain combinations and even initially claimed as such, one or more features from a claimed combination may in certain embodiments be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodiments, and it should be understood that the described program components and systems may generally be integrated together in a single software product or packaged into multiple software products.

A number of embodiments have been described herein. Nevertheless, it will be understood that various modifications may be made without departing from the spirit and scope of the disclosure. For example, various forms of the flows described herein may be used, with steps re-ordered, added, or removed. Accordingly, other embodiments are within the scope of the following claims.

The invention claimed is:

1. A method comprising:
   receiving, by a decentralized device management system, a request from an Internet of Things (IoT) device to transmit a message to an external service, wherein the IoT device and the external service utilize different communication protocols;
   accessing, by the decentralized device management system, permission information stored on a distributed ledger of the decentralized device management system, the permission information indicating that the IoT device is authorized to transmit a type of the message to the external service, wherein the type of the message indicates a content type of the message;
   determining, by the decentralized device management system, whether the IoT device is permitted to transmit the message to the external service based at least in part on the permission information; and
   transmitting, by the decentralized device management system, a command to the IoT device to enable the IoT device to transmit the message from the IoT device to the external service across the different communication protocols upon determination that the IoT device is authorized to transmit the type of the message to the external service.

2. The method of claim 1, wherein the content type of the message is one of a plurality of content types including a content type relating to a status of a service provided to the IoT device.

3. The method of claim 1, wherein the content type of the message is one of a plurality of content types including a content type relating to payment for a service provided to the IoT device.

4. The method of claim 1, wherein the content type of the message is one of a plurality of content types including a content type relating to an order for a replacement component for the IoT device.

5. The method of claim 1, wherein the content type of the message is one of a plurality of content types including a content type relating to enabling communications with the external service to a user of the IoT device.

6. The method of claim 1, wherein the external service comprises a utility service, a financial service, or an e-commerce service.

7. The method of claim 1, wherein the permission information indicates at least one constraint on interaction with the IoT device.

8. The method of claim 7, wherein the at least one constraint comprises a time period constraint indicating a time period within which interaction with the IoTd device is allowed.

9. The method of claim 7, wherein the at least one constraint comprises an interaction count constraint indicating a number of permitted interactions with the IoT device.

10. The method of claim 7, wherein the at least one constraint comprises a distance constraint indicating a threshold distance within which interaction with the IoT device is allowed.

11. The method of claim 7, wherein the at least one constraint includes a command type constraint indicating a particular command or particular type of command permitted.

12. The method of claim 7, wherein the at least one constraint includes a biometric authentication constraint indicating at least one biometric authentication mode employed to enable interaction with the IoT device.

13. The method of claim 1, wherein the distributed ledger is a blockchain.

14. A system comprising:
at least one processor; and
a memory communicatively coupled to the at least one processor, the memory storing instructions which, when executed, cause the at least one processor to perform operations comprising:
receiving, by a decentralized device management system, a request from an Internet of Things (IoT) device to transmit a message to an external service, wherein the IoT device and the external service utilize different communication protocols;
accessing, by the decentralized device management system, permission information stored on a distributed ledger of the decentralized device management system, the permission information indicating that the IoT device is authorized to transmit a type of the message to the external service, wherein the type of the message indicates a content type of the message;
determining, by the decentralized device management system, whether the IoT device is permitted to transmit the message to the external service based at least in part on the permission information; and
transmitting, by the decentralized device management system, a command to the IoT device to enable the IoT device to transmit the message from the IoT device to the external service across the different communication protocols upon determination that the IoT device is authorized to transmit the type of the message to the external service.

15. The system of claim 14, wherein the content type of the message is one of a plurality of content types including a content type relating to a status of a service provided to the IoT device.

16. The system of claim 14, wherein the content type of the message is one of a plurality of content types including a content type relating to payment for a service provided to the IoT device.

17. The system of claim 14, wherein the content type of the message is one of a plurality of content types including a content type relating to an order for a replacement component for the IoT device.

18. The system of claim 14, wherein the content type of the message is one of a plurality of content types including a content type relating to enabling communications with the external service to a user of the IoT device.

19. The system of claim 14, wherein the external service comprises a utility service, a financial service, or an e-commerce service.

20. One or more computer-readable storage media storing instructions which, when executed, cause at least one processor to perform operations comprising:
receiving, by a decentralized device management system, a request from an Internet of Things (IoT) device to transmit a message to an external service, wherein the IoT device and the external service utilize different communication protocols;
accessing, by the decentralized device management system, permission information stored on a distributed ledger of the decentralized device management system, the permission information indicating that the IoT device is authorized to transmit a type of the message to the external service, wherein the type of the message indicates a content type of the message;
determining, by the decentralized device management system, whether the IoT device is permitted to transmit the message to the external service based at least in part on the permission information; and
transmitting, by the decentralized device management system, a command to the IoT device to enable the IoT device to transmit the message from the IoT device to the external service across the different communication protocols upon determination that the IoT device is authorized to transmit the type of the message to the external service.

* * * * *